United States Patent
Gabriel et al.

(10) Patent No.: US 12,484,893 B2
(45) Date of Patent: Dec. 2, 2025

(54) MULTISPAN CINCHABLE LOOPS FOR KNOTLESS SPANNING OF TISSUE BETWEEN ANCHOR POINTS AND TOOLS FOR USING THE SAME

(71) Applicant: Medos International Sarl, Le Locle (CH)

(72) Inventors: Stefan M. Gabriel, Mattapoisett, MA (US); Gerome O. Miller, Randolph, MA (US); Mehmet Ziya Sengun, Canton, MA (US); Howard Tang, Boston, MA (US); Mark Shainwald, Bridgewater, MA (US)

(73) Assignee: Medos International Sàrl, Le Loche (CH)

( * ) Notice: Subject to any disclaimer, the term of this patent is extended or adjusted under 35 U.S.C. 154(b) by 497 days.

(21) Appl. No.: 17/854,500

(22) Filed: Jun. 30, 2022

(65) Prior Publication Data

US 2024/0000445 A1    Jan. 4, 2024

(51) Int. Cl.
*A61B 17/04* (2006.01)
*A61F 2/08* (2006.01)

(52) U.S. Cl.
CPC .. *A61B 17/0401* (2013.01); *A61B 2017/0409* (2013.01); *A61B 2017/0462* (2013.01); *A61B 2017/0464* (2013.01); *A61F 2/0811* (2013.01); *A61F 2002/0852* (2013.01)

(58) Field of Classification Search
CPC .................... A61B 17/0401; A61F 2002/0852
See application file for complete search history.

(56) References Cited

U.S. PATENT DOCUMENTS

| | | |
|---|---|---|
| 7,150,750 B2 | 12/2006 | Damarati |
| 8,262,675 B2 | 9/2012 | Cropper et al. |
| 8,870,915 B2 | 10/2014 | Mayer et al. |
| 9,089,320 B2 | 7/2015 | Spivey et al. |
| 9,345,567 B2 | 5/2016 | Sengun |

(Continued)

FOREIGN PATENT DOCUMENTS

EP    3235456 B1    6/2020

OTHER PUBLICATIONS

International Partial Search Report for Application No. PCT/IB2023/056771, mailing date Oct. 10, 2023.

*Primary Examiner* — Erin Mcgrath
(74) *Attorney, Agent, or Firm* — Barnes & Thornburg LLP

(57) ABSTRACT

A suture construct includes a single filament of suture forming two cinchable loops from separate finger trap arrangements, with a fixed-length spanning portion extending between fixed portions of the two finger traps. A tail of the suture extends from each finger trap and is slidably disposed therein to cinch the respective loop. The construct can include an anchor slidably coupled to each of the first and second loops. An inserter for the construct includes first and second insertion devices, each having a proximal handle and distal insertion shaft. The two handles couple together to dispose the insertion shafts alongside each other, with a first shaft extending through the second handle shaft and beyond the second shaft. The first handle is coupled proximal to the second such that the first device can be decoupled from the second by removing it proximally, which withdraws the first shaft from the second handle.

20 Claims, 22 Drawing Sheets

(56) References Cited

U.S. PATENT DOCUMENTS

| | | |
|---|---|---|
| 9,492,160 B2 | 11/2016 | Torrie et al. |
| 9,775,598 B2 | 10/2017 | Riina et al. |
| 10,548,590 B2 | 2/2020 | Harris et al. |
| 10,893,940 B2 | 1/2021 | Alon |
| 11,116,495 B2 | 9/2021 | Stone et al. |
| 11,141,149 B2 | 10/2021 | DiMatteo et al. |
| 2007/0100352 A1 | 5/2007 | Deffenbaugh et al. |
| 2008/0312689 A1 | 12/2008 | Denham et al. |
| 2017/0303907 A1* | 10/2017 | Sengun .............. A61B 17/0401 |
| 2021/0378654 A1 | 12/2021 | Lombardo |

* cited by examiner

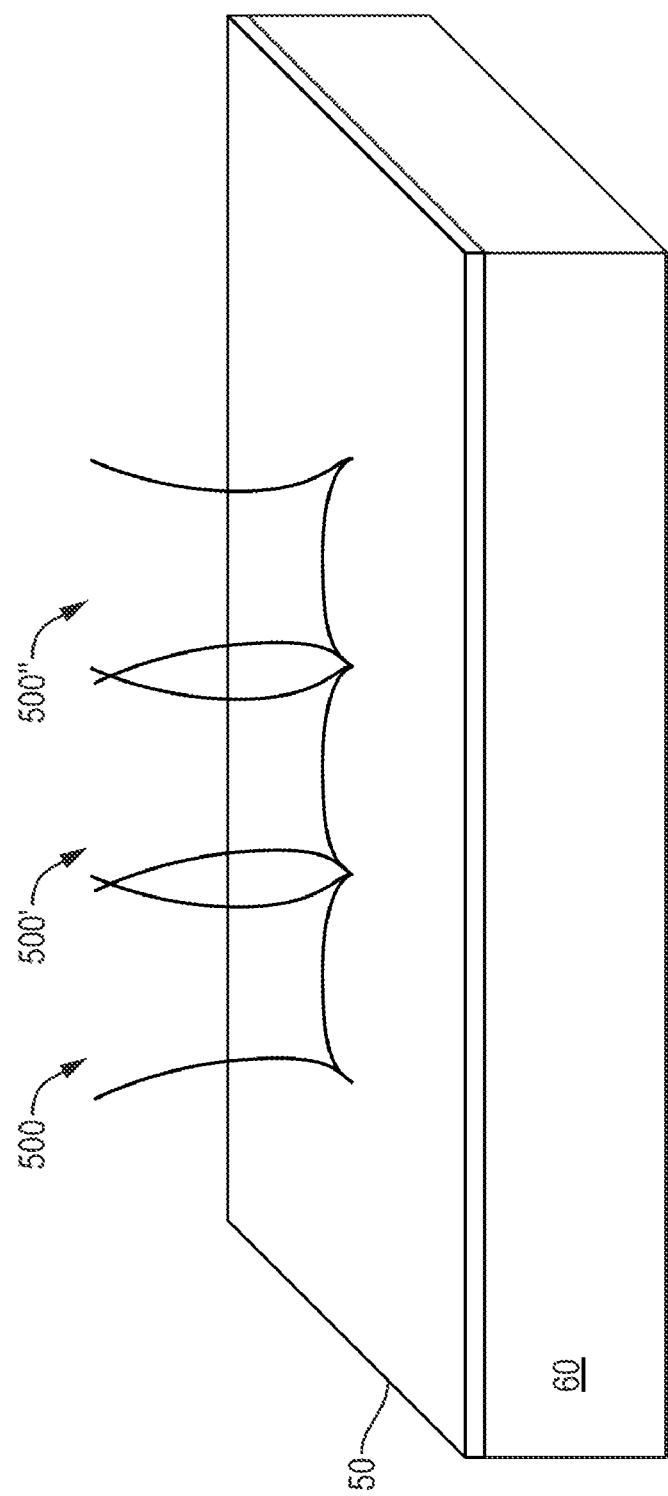

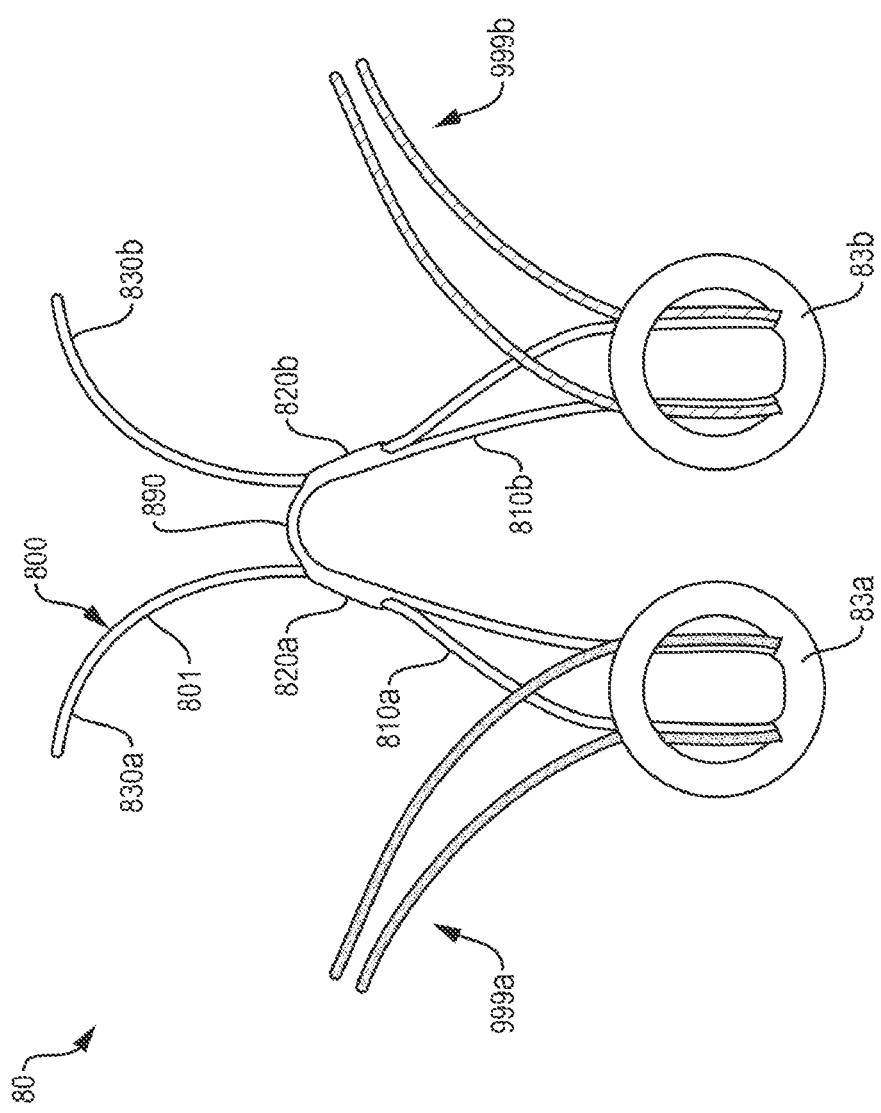

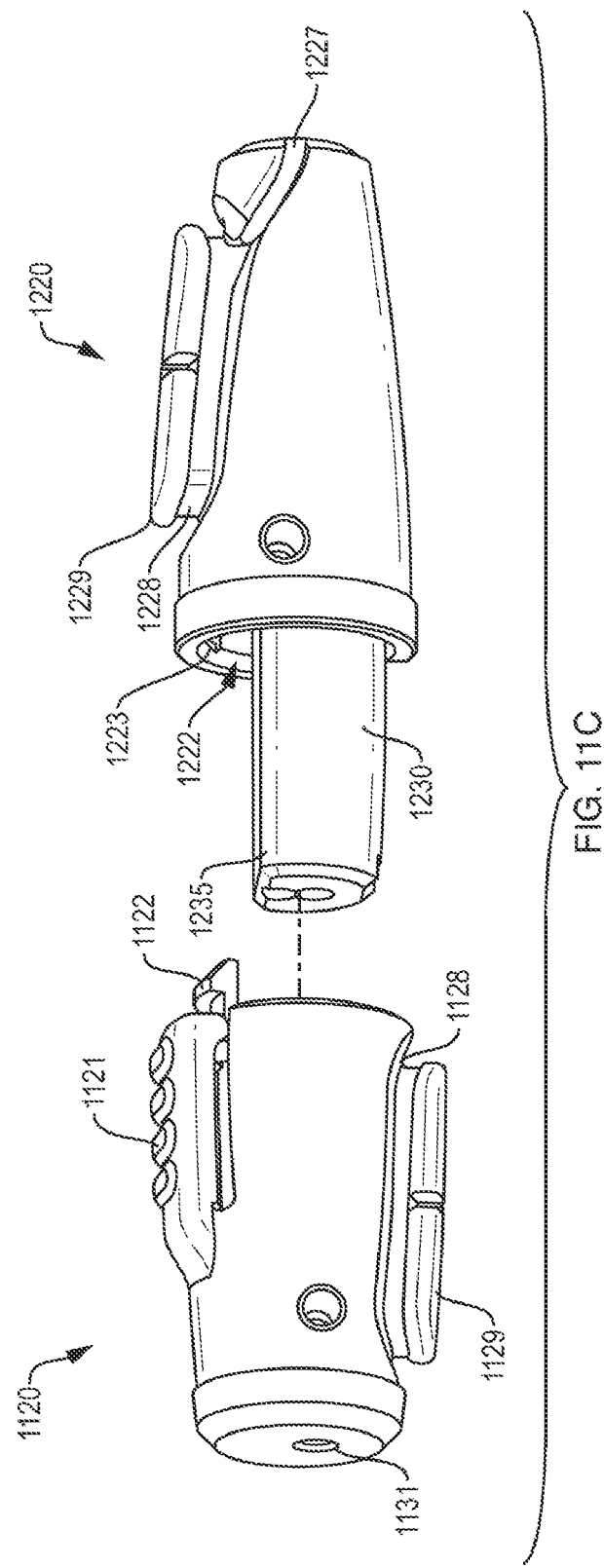

MULTISPAN CINCHABLE LOOPS FOR KNOTLESS SPANNING OF TISSUE BETWEEN ANCHOR POINTS AND TOOLS FOR USING THE SAME

FIELD

The application relates generally to devices and methods for securing soft tissue (e.g., ligament, tendon, graft) to bone, and more particularly to suture constructs for creating a tensionable link between at least two anchors inserted using the same inserter, and an embodiment of such an inserter.

BACKGROUND

A common injury, especially among athletes and people of advancing age, is the complete or partial detachment of tendons, ligaments, or other soft tissues from bone. Ligaments are the fibrous tissue that connects bones to other bones within the body and tendons are the fibrous tissue that connect muscles to bones within the body. Tissue detachment may occur in many ways, e.g., as the result of an accident such as a fall, overexertion during a work-related activity, during the course of an athletic event, or in any one of many other situations and/or activities. These types of injuries are generally the result of excess stress or extraordinary forces being placed upon the tissues. When ligaments are damaged, surgical reconstruction can be necessary, as the ligaments may not regenerate on their own. In the case of a partial detachment, commonly referred to under the general term "sprain," the injury frequently heals without medical intervention, the patient rests, and care is taken not to expose the injury to undue strenuous activities during the healing process. If, however, the ligament or tendon is completely detached from its attachment site on an associated bone or bones, or if the ligament or tendon is severed as the result of a traumatic injury, surgical intervention may be necessary to restore full function to the injured joint. Currently available devices for tissue attachment include screws, staples, suture anchors, and tacks.

Repair constructs made from one or more surgical filaments are typically used in soft tissue repair procedures, such as rotator cuff fixations, to secure the tissue in a desired location. The repair constructs are typically disposed through one or more portions of the tissue to be repaired, which can cause trauma to the tissue, and are often coupled to anchors disposed in bone to which the tissue is to be approximated.

Soft tissue repairs include arthroscopic repairs of rotator cuff tears. These types of repairs can be long and difficult procedures, involving bone hole creation, finding any bone hole again after creation, placing an anchor into each bone hole, and managing multiple suture limbs. This action of managing multiple suture limbs can include identifying the limbs, isolating them from one another, and/or passing them through tissue, for example using stitching passes. This procedural complexity can result in overly long operating room times, and/or inferior repairs, which may lead to a variety of complications understood by those skilled in the art.

A number of surgical procedures exist for rotator cuff repairs, and re-attaching ligaments, or other soft tissue, to bone more generally. However, existing devices and methods can be limited at least because they do not always provide the desired strength or adjustability. Many existing devices and methods are configured to secure soft tissue to a single bone anchor, which is inserted into bone using a tool. In some instances, for example, where multiple bone anchors are needed, inserting multiple anchors into bone requires multiple insertions of an insertion tool into the surgical site, with each insertion involving the placement of a bone anchor and associated suture construct at separate locations. Still further, some existing devices and methods also need to use additional fixation devices, such as a cortical button, with each suture construct being used to facilitate the fixation of soft tissue to bone.

Accordingly, there is a need for improved fixation devices and repair and reconstruction procedures that allow for multiple bone anchor locations. In particular, there is a need for an instrument that can be used with anchors that can enable surgical techniques benefitting from sequential implantation of soft anchors without the need for instrument exchanges, thereby saving surgical time, reducing trauma, and making such surgery easier.

SUMMARY

Examples of the present disclosure include systems, devices, and methods for performing surgical procedures involving sutures, such as rotator cuff repairs, among other soft tissue repair procedures. More specifically, certain examples of the systems, devices, and methods disclosed allow a user to create a tensionable link between at least two anchors inserted using the same inserter, and embodiments of such an inserter are disclosed herein.

Representative examples include a suture construct that has a length of suture that traverses through an anchor, forms a loop including that anchor by going through a self-locking mechanism, such as a splice (e.g., finger trap) in itself, traverses through a second anchor, and forms a second loop including that second anchor by going through another self-locking mechanism, such as a splice (e.g., finger trap) in itself, at some distance from the first self-locking mechanism such that pulling the ends of the suture closes the loops. The self-locking mechanisms of the suture serve to allow constriction of the loops, but resist expansion of the loops. The self-locking mechanisms can be splices (e.g., finger traps) or knots, among other constructions that achieve the purpose of allowing constriction while resisting expansion. In some examples, a single strand of suture is used to construct the suture construct, except for the anchors. The anchors can also include a suture or sutures loaded into each of them to serve as a means of pulling on the anchors separate from any force applied to the length of suture forming the constricting loops. These additional sutures may be used to "set" the anchors into bone or at a location beyond a hole through which they were placed by making the anchor "scrunch" up within the bone (or beyond the hole) when force is applied, thereby allowing the anchors to resist further application of force tending to dislodge them from bone (or to bring them back through the hole). The constructs disclosed herein can be used in various surgical repair procedures in which soft tissue is to be disposed or approximated at desired locations with respect to bones.

One example of the present disclosure is suture construct formed from a first flexible member that includes a first adjustment mechanism, a second adjustment mechanism, a first tail, a second tail, a spanning portion, a first anchor, and a second anchor. The first adjustment mechanism is formed in the first flexible member to create a first loop extending from the first adjustment mechanism, with the first loop defining a first loop opening. The first tail of the first flexible member extends from the first adjustment mechanism and the spanning portion of the first flexible member extends from the first adjustment mechanism. The second adjustment mechanism is also formed in the first flexible member, and is done so to create a second loop extending from the second adjustment mechanism. The second loop defines a second loop opening. The second tail of the first flexible member extends from the second adjustment mechanism, the first anchor is slidably coupled to a first portion of the suture of the first loop, and the second anchor is slidably coupled to a second portion of the suture of the second loop. Further, the first tail is configured to slide with respect to the first adjustment mechanism to reduce a size of the first loop opening, and thus reduce a first distance between the first anchor and the first adjustment mechanism, and the second tail is configured to slide with respect to the second adjustment mechanism to reduce a size of the second loop opening, and thus reduce a second distance between the first anchor and the second adjustment mechanism. Still further, the spanning portion of the first flexible member defines a fixed a distance along the suture between the first adjustment mechanism and the second adjustment mechanism.

At least one of the first adjustment mechanism or the second adjustment mechanism can include a self-locking knot. Likewise, at least one of the first adjustment mechanism or the second adjustment mechanism can include a finger trap arrangement. In some embodiments the first adjustment mechanism can include a first finger trap with the first tail passing through the first finger trap, and the second adjustment mechanism can include a second finger trap with the second tail passing through the second finger trap. In some such embodiments, the spanning portion can be defined by a fixed length of suture between the first finger trap and the second finger trap. The first and second finger traps can each define a length along the first flexible member approximately in the range of about 1 mm to about 10 mm. The fixed length of the spanning portion can be approximately in the range of about 1 mm to about 10 mm. At least one of the first anchor or the second anchor can be a soft anchor constructed from a woven material. The first flexible member can be a single continuous flexible member.

The suture construct can further include a second flexible member extending through the first anchor such that the first anchor is also slidably disposed on the second flexible member. The first flexible member and the second flexible member can extend through a same path through the first anchor. The suture construct can further include a third flexible member extending through the second anchor such that the second anchor is also slidably disposed on the third flexible member. The second flexible member can be a flexible member of a loop of another suture construct.

Another example of the present disclosure is a method for preparing a surgical implant that includes passing a first tail of a first flexible member through a first anchor and, after passing the first tail through the first anchor, creating a first loop in the first flexible member by forming a first adjustment mechanism. The first flexible member with the first tail and a first portion of the first flexible member extend from one side of the first adjustment mechanism and the first loop extends from an opposite side of the first adjustment mechanism such that the first anchor is slidably disposed on the first flexible member of the first loop. The method further includes passing a second tail of the first flexible member through a second anchor and, after passing the second tail through the second anchor, creating a second loop in the first flexible member by forming a second adjustment mechanism. The first flexible member with the second tail and a second portion of the first flexible member extend from one side of the second adjustment mechanism and the second loop extends from an opposite side of the second adjustment mechanism such that the second anchor is slidably disposed on the first flexible member of the second loop. The first portion of the first flexible member and the second portion of the first flexible member together define a spanning portion of the first flexible member that defines a fixed length of the first flexible member between the first adjustment mechanism and the second adjustment mechanism. Tension on the first tail cinches the first loop and reduces a maximum distance between the first anchor and the spanning portion, and tension on the second tail cinches the first loop and reduces a maximum distance between the second anchor and the spanning portion.

At least one of the first adjustment mechanism or the second adjustment mechanism can include a self-locking knot and/or at least one of the first adjustment mechanism or the second adjustment mechanism can include a finger trap arrangement. The method can include the first adjustment mechanism including a first finger trap with the first tail passing through the first finger trap, the second adjustment mechanism including a second finger trap with the second tail passing through the second finger trap, and the spanning portion being defined by a fixed length of suture between the first finger trap and the second finger trap. The first flexible member can be a single continuous flexible member.

The method can further include passing a tail of a second flexible member through the first anchor such that the first anchor is also slidably disposed on the second flexible member. The first flexible member and the second flexible member can extend through a same path through the first anchor. The method can further include passing a tail of a third suture filament through the second anchor such that the second anchor is also slidably disposed on the third suture filament. The second suture filament can be a suture filament of a loop of another suture construct according to those described above or elsewhere in the present disclosure.

Yet another example of the present disclosure is a surgical instrument that includes a first insertion device and a second insertion device. The first insertion device includes a first inserter shaft with a first distal tip configured to hold and implant an anchor into tissue and a first handle disposed about a proximal end of the first inserter shaft. The second insertion device is configured to couple with the first insertion device and includes a second inserter shaft having a second distal tip configured to hold and implant an anchor into tissue and a second handle disposed about a proximal end of the second inserter shaft. The second handle has a bore through it and is configured to have the first inserter shaft disposed in it when the second insertion device is coupled with the first insertion device. The first handle is configured to removably couple to a distal end of the second handle such that the first insertion device can be decoupled from the second insertion device, for example, by proximally withdrawing the first handle from the second handle and thus proximally withdrawing the first inserter shaft from the bore of the second handle. Further, the first distal tip of the first inserter shaft extends distally beyond the second distal tip of the second inserter shaft when the first and second insertion devices are coupled.

A proximal tip of the first insertion shaft can extend proximally beyond the first handle. A proximal tip of the second insertion shaft can extend proximally beyond the second handle. The first and second insertion shafts can be adjacent and substantially parallel along their respective lengths when the first instrument is coupled with the second instrument. The first and second handles, when coupled, can define a continuous single handle of the surgical instrument.

The first handle can include a latch configured to removably secure the coupling of the first handle to the second handle, and the first handle can include a flexible portion for controlling engagement of the latch with the second handle. The flexible portion can also enable force applied to the flexible portion by a user to release the engagement of the latch with the second handle. The first handle can have a first spindle configured to hold a length of suture extending from the first distal tip. The second handle can have a second spindle configured to hold a length of suture extending from the second distal tip. The second handle can include a recess configured to receive a length of suture extending from the first distal tip to the first spindle.

The surgical instrument can further include a breakaway sheath configured to be disposed around the first and second instrument shafts and extend from the second handle to the first distal tip. The proximal end of the breakaway sheath can define a first section that can be configured to be removed from being disposed around the first and second instrument shafts and, after being removed, can allow proximal translation of the breakaway sheath to expose the first distal tip while still covering the second distal tip. Further, the breakaway sheath can include a second section, which can be arranged distal to the first section, and can be configured to be removed from being disposed around the first and second instrument shafts. Further, after being removed, the second section can allow proximal translation of the breakaway sheath to expose the second distal tip.

The surgical instrument can further include a suture construct according to examples disclosed above or otherwise herein coupled to the surgical instrument with the first anchor held by the first distal tip, the second anchor held by the second distal tip, and the first and second tails of the first flexible member secured to the second handle.

Still another example of the present disclosure is a method of securing soft tissue to bone, the method including navigating a first distal tip of a first insertion shaft of a first instrument carrying a first anchor through a soft tissue at a first location and inserting the first anchor into bone at a second location. The anchor has a first cinchable loop of a suture construct coupled to it. The method further includes disposing the first anchor in the second location by withdrawing the first distal tip from the first and second locations. The withdrawing includes proximally withdrawing the first insertion shaft from a second handle of a second instrument. The second instrument has a second insertion shaft with a second distal tip carrying a second anchor, with the second anchor having a second cinchable loop of the suture construct coupled to it. The method further includes navigating the second distal tip of the second first insertion shaft through the soft tissue at a third location and inserting the anchor into bone at a fourth location, as well as disposing the second anchor in the fourth location by withdrawing the second distal tip from the third and fourth locations. The action of withdrawing includes disposing a spanning portion of the suture construct across the soft tissue, with the spanning portion fixedly coupling a first adjustment mechanism of the first cinchable loop to a second adjustment mechanism of the second cinchable loop. The method still further includes tensioning the spanning portion against the soft tissue by at least one of: (1) tensioning a first tail of the suture construct extending from the first adjustment mechanism, the tensioning cinching the first loop and drawing the first adjustment mechanism towards the first anchor; and (2) tensioning a second tail of the suture construct extending from the second adjustment mechanism, the tensioning cinching the second loop and drawing the second adjustment mechanism towards the second anchor.

The second anchor can include a third cinchable loop of a second suture construct coupled to it. The method can further include, after disposing the second anchor in the fourth location, navigating a distal tip of an insertion shaft carrying a third anchor through the soft tissue at a fifth location and inserting the third anchor into bone at a sixth location. The third anchor can have a fourth cinchable loop of the second suture construct coupled to it. The method can further include disposing the third anchor in the sixth location by withdrawing the distal tip from the fifth and sixth locations, with the withdrawing action including disposing a second spanning portion of the second suture construct across the soft tissue. The second spanning portion can fixedly couple a third adjustment mechanism of the third cinchable loop to a fourth adjustment mechanism of the fourth cinchable loop. Still further, the method can include tensioning the spanning portion against the soft tissue by at least one of: (1) tensioning a third tail of the second suture construct extending from the third adjustment mechanism, the tensioning cinching the third loop and drawing the third adjustment mechanism towards the second anchor; and (2) tensioning a fourth tail of the second suture construct extending from the fourth adjustment mechanism, the tensioning cinching the fourth loop and drawing the fourth adjustment mechanism towards the third anchor.

The suture construct can be formed from a single flexible member and, in at least some embodiments, can be coupled to two bone anchors (e.g., all-suture anchors, or toggle anchors, or other suitable anchors for anchoring into bone) for use in various soft tissue repair procedures. The single flexible member can include two self-locking mechanisms, such as splices or knots formed therein, that are a substantially fixed distance apart, each self-locking mechanism defining a loop portion. Each loop portion extends from a respective self-locking mechanism, and each loop portion is coupled with an anchor, such as a soft anchor. Examples construct can also be used with push-in hard anchors, where the anchors are placed and held in the bone by pushing them axially into place. Sliding tails formed from the flexible member and extending from the self-locking mechanisms can be operable to constrict or otherwise make the corresponding loop portions smaller, which in turn draws the respective anchor towards the self-locking mechanism.

In one exemplary embodiment, a suture construct formed from a flexible member includes a first finger trap formed in the flexible member, a first tail of the flexible member that extends from the first finger trap, a spanning portion of the flexible member, a second finger trap formed in the flexible member, and a second tail of the flexible member that extends from the second finger trap. The first finger trap creates a first loop that extends from the first finger trap, with the first finger trap defining a first loop opening. The spanning portion extends from the first finger trap, connecting the first finger trap to the second finger trap. The second finger trap creates a second loop that extends from the second finger trap, with the second loop defining a second loop opening. The first tail is configured to slide with respect to the first finger trap to reduce a size of the first loop opening, and thus reduce the size of the adjustable loop opening. Similarly, the second tail is configured to slide with respect to the second finger trap to reduce a size of the second loop opening. The spanning portion is configured to prevent expansion of the loops opening when the suture is manipulated into a locked configuration. The spanning portion allows forces, which might otherwise loosen the construct, to be transmitted to the opposing finger traps, thereby preventing expansion of the loops opening when the suture is manipulated into a locked configuration.

At least one of the adjustment mechanics can be a knot, such as a self-locking knot. Non-limiting examples of such knots include a FIG. 8 noose knot, an expanded figure-8 noose knot, or a prusik-style knot. The flexible member can be unspliced at locations of the first and second knots. A fixation body can be coupled to the spanning portion of the flexible member. For example, the spanning portion can be passed through a plurality of through-holes disposed in the fixation body.

The suture construct can also include an unlocked configuration. In some such embodiments, the suture can be configured to be moved between the locked configuration and the unlocked configuration by adjusting relative loading of the spanning portion and/or the tail portion (i.e., the first tail and/or the second tail). In one exemplary embodiment of a surgical implant, the implant includes a fixation body and a flexible member coupled to the fixation body. The fixation body has a longitudinal axis extending therealong, first and second sides, and first and second through-holes. The flexible member includes a first portion having a first tail, a first knot formed on the first portion, and a first loop portion. The first tail extends through the first through-hole, the first knot is disposed on the first side of the body, and the first loop portion extends from the first knot, away from the body. The flexible member also includes a second portion having a second tail, a second knot formed on the second portion, and a second loop portion. The second tail extends through the second through-hole, and the second loop portion extends from the second knot, away from the body. The flexible member further includes a spanning portion that extends across the fixation body and from the first knot to the second knot. The first and second knots are further configured such that tension on the bridge portion prevents expansion of the adjustable loop.

At least one of the first knot or the second knot can be a self-locking knot. Non-limiting examples of such knots include a figure-8 noose knot, an expanded figure-8 noose knot, or a prusik-style knot. The flexible member can be unspliced at locations of the first and second knots.

BRIEF DESCRIPTION OF DRAWINGS

This disclosure will be more fully understood from the following detailed description taken in conjunction with the accompanying drawings, in which:

FIGS. 7A and 7B are schematic perspective views of a portion of the plurality of multi-loop tensionable suture constructs spanning a sequence of anchors of FIG. 6 in an installed configuration;

FIG. 8 is a photograph providing a side view of an example of a multi-loop tensionable suture construct spanning between multiple suture anchors;

FIG. 11C is a perspective side view of the two-handle assembly of FIGS. 11A and 11B with the handles separated;

DETAILED DESCRIPTION

Figure 1:
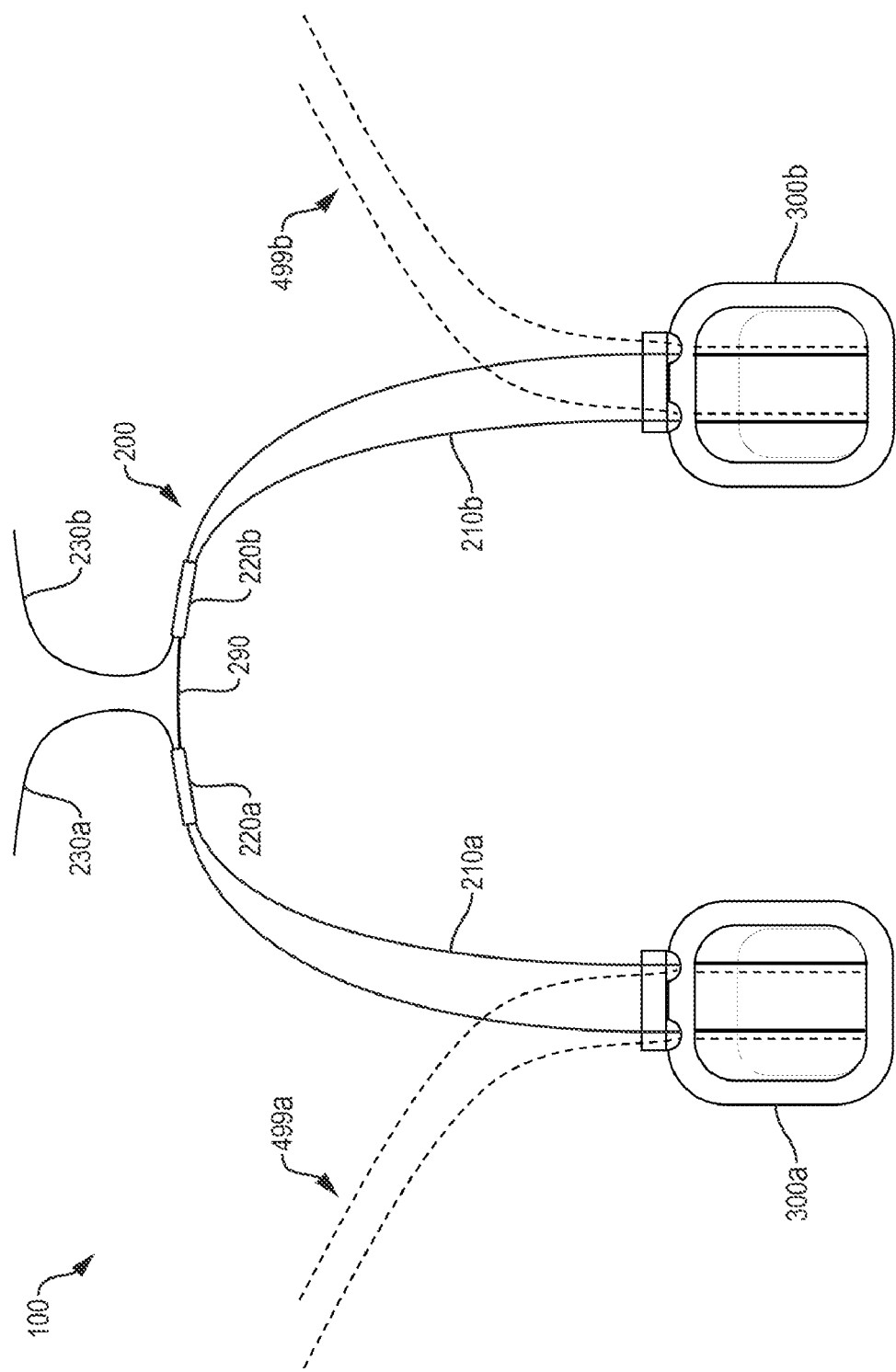
FIG. 1 is a schematic side view of one exemplary embodiment of a multi-loop tensionable suture construct spanning between multiple suture anchors.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

The figures provided herein are not necessarily to scale. Further, to the extent arrows are used to describe a direction a component can be tensioned or pulled, these arrows are illustrative and in no way limit the direction the respective component can be tensioned or pulled. A person skilled in the art will recognize other ways and directions for creating the desired tension or movement. Likewise, while in some embodiments movement of one component is described with respect to another, a person skilled in the art will recognize that other movements are possible. Additionally, a number of terms may be used throughout the disclosure interchangeably but will be understood by a person skilled in the art. By way of non-limiting example, the terms "suture," "filament," and "suture filament" may be used interchangeably with one another and with "flexible member."

The present disclosure is generally directed to methods and devices for securing soft tissue, including but not limited to ligaments, tendons, and grafts, to bone or other desired locations within a subject (e.g., human, animal). Surgical implants described herein generally include a suture construct formed from a flexible member such as a suture (also referred to as a filament or suture filament) threaded through, or otherwise associated with, two suture anchors in a manner that slidably disposes each suture anchor on an adjustable loop of the suture construct, with a fixed-length spanning portion extending between an adjustment mechanism (e.g., knots, splices, finger traps) of each adjustable loop. A person skilled in the art will appreciate that a flexible member comprises any component capable of being pliable for use in surgical procedures such as those provided for herein, including but not limited to suture, filament, suture filament, woven suture or filament, monofilament, and other materials used to form the same and/or used to form other "soft" components, such as soft anchors. The size of each adjustable loop can be adjusted by manipulating one or both of the interconnecting loops of suture using terminal ends of the suture. FIGS. 1-9 illustrate examples of the surgical implant with a suture construct and two anchors and their use. Examples include using multiple suture constructs in series with multiple anchors to secure tissue across a plurality of sequential points with spanning portions of each suture construct extending across tissue between anchors from each of the plurality of sequential points.

Examples of the present disclosure also include surgical instruments for using the suture construct, with the instrument having separate first and second insertion shafts, each carrying one of the two anchors, such that the instrument can be delivered into a surgical site to install both anchors without removing the entire instrument. In some examples, the surgical instrument is an assembly of two separable insertion instruments, with one having an insertion point that extends distally beyond the insertion point of the other such that one of the anchors of the surgical implant can be installed with the distal-most end of the assembly and, after the first installation, the portion insertion instrument used to install the first anchor can be withdrawn or otherwise at least partially separated from the other (e.g., decoupling the assembly), leaving the insertion shaft of the remaining instrument to install the second anchor of the surgical implant.

Example Suture Constructs and Implants

FIG. 1 is a schematic illustration of one exemplary embodiment of a surgical implant 100 that includes a multi-loop tensionable suture construct 200 spanning between multiple suture anchors 300a, 300b. The suture construct 200 can include a first tail 230a that extends through a first adjustment mechanism 220a to form a first loop 210a and a second tail 230b that extends through a second adjustment mechanism 220b to form a second loop 210b. The suture construct 200 can be formed from a single flexible member or multiple flexible members. The first and second adjustment mechanisms 220a, 220b can be knots, such as self-locking knots, or splices in the suture, such as a finger trap arrangement. In at least some instances, the adjustment mechanisms 220a, 220b can be self-locking such that tension on the loop portion 210a, 210b (e.g., by tensioning a tail 230a, 230b to cinch the respective loop 210a, 210b) prevents movement of the respective tail 230a, 230b back through the adjustment mechanisms 220a, 220b into the loop portion 210a, 210b (e.g., loosening or uncinching the loop). The suture construct 200 can include a length of suture between the first and second adjustment mechanisms 220a, 220b, which is at least sometimes referred to herein as a spanning portion 290 at least because, in an installed configuration, it can be positioned to span across a portion of tissue between locations where the loops 210a, 210b extend into the tissue. The spanning portion 290, in at least some instances, can define a fixed length of suture between the first and second adjustment mechanisms 220a, 220b. The fixed length can be defined, for example, by a span of suture extending between proximal terminal ends 220at and 220bt of the adjustment mechanisms 220a, 220b, respectively. It at least some instances, it can be advantageous to keep a length of the spanning portion 290 as small as possible, for example to allow anchor placement between two anchors to be as close as possible. In some non-limiting embodiments, the spanning portion can have a length approximately in the range of about 1 mm to about 10 mm, or approximately in the range of about 3 mm to about 5 mm. Whereas the one-way locking effectiveness of the adjustment mechanisms 220a and 220b might generally increase with increasing lengths 292a and 292b up to approximately a range of about 3 mm to about 5 mm, the effectiveness of the construct in locking the loops does not depend on the span length 291. In general, a smaller span length 291 can allow placement of anchors within each of the loops closer to one another. Including the size of the anchors, the depth of the anchor placements into bone, and the thickness of the tissue being spanned, a span length 291 approximately in the range of about 3 mm to about 5 mm allows a surgeon to place the anchors as close to one another as desired (without placing them on top of one another). A person skilled in the art will appreciate other lengths are possible, depending, at least in part, on the type of procedure being performed, the anatomy of the patient, and/or the preference of the surgeon, among other factors appreciated by the skilled person.

The surgical implant 100 also includes a first anchor 300a disposed on the first loop 210a of the suture construct 200 and a second anchor 300b disposed on the second loop 210b of the suture conduct 200. These anchors can include hard anchors, such as Healix Ti™ anchors, Healix Advance™ anchors, Helix Advance Knotless™ anchors, Healix BR™ anchors, Healix PEEK™ anchors, Healix Transtend™ anchors, Bioknotless® anchors, Gryphon® anchors, Fastin® anchors, Versalok® anchors, Microfix® anchors, Minilok™ anchors, Micro-Quickanchors® anchors, and Tacit® anchors, each of which is also commercially available from DePuy Synthes, as well as soft anchors, such as the VERSALOOP™ anchors also commercially available from DePuy Synthes. Some exemplary embodiments of other soft suture anchors that can be used in conjunction with the present disclosures include those described in U.S. Pat. No. 9,345,567 of Sengun, the content of which is incorporated by reference herein in its entirety. The anchors 300a, 300b in the illustrated embodiment are soft anchors, which can be constructed from a woven material, such as a suture material. In some examples, the anchors 300a, 300b can be slidably disposed on the respective loop 210a, 210b such that the suture of the loop 210a, 210b can slide through the anchor 300a, 300b. This arrangement can allow, for example, the anchor 300a, 300b to be installed into tissue, such as bone, and then allow tension on the tail 230a, 230b of the respective loop 210a, 210b to cinch the loop by advancing suture though the anchor 300a, 300b to draw the adjustment mechanism of the loop closer to the anchor 300a, 300b.

As shown, the surgical implant 100 can also include an additional length of suture 499a, 499b extending to and through each anchor 300a, 300b. In some examples, one or both of these additional lengths of suture 499a, 499b can be setting sutures for helping to guide the respective anchor 300a, 300b to a desired or designated location, for example by pulling on the setting sutures 499a, 499b to actuate or otherwise set the respective anchor 300a, 300b into a locked configuration at the desired or designated positions and/or move the respective anchors 300a, 300b to a desired or designated position at a surgical site, and/or actuating or otherwise setting the respective anchor 300a, 300b into a locked configuration at the desired or designated positions. Setting the anchors 300a, 300b into a locked configuration can also, or instead, involve applying tension to the respective anchor 300a, 300b to cause the anchor to adjust from its initial configuration, in which the anchor may have a lower profile, width, and/or diameter to allow it to more easily pass through small incisions and/or openings to reach a surgical site, to the locked configuration, in which the anchor may have a larger width or diameter than the initial configuration (e.g., being in a "bunched" or "scrunched" configuration) to help prevent the anchor from dislodging or otherwise moving from its desired or designated location when force is applied to it. The additional length of suture 499a, 499b can be threaded through the respective anchor 300a, 300b in a fashion similar to the suture of the loop 210a, 210b, which can include, for example, passing through a same path as the suture of the loop 210a, 210b on which the anchor 300a, 300b is disposed. In other examples, an additional length of suture passed through the anchor is a loop of another suture construct 200, as shown in more detail in FIG. 6.

Figure 2:
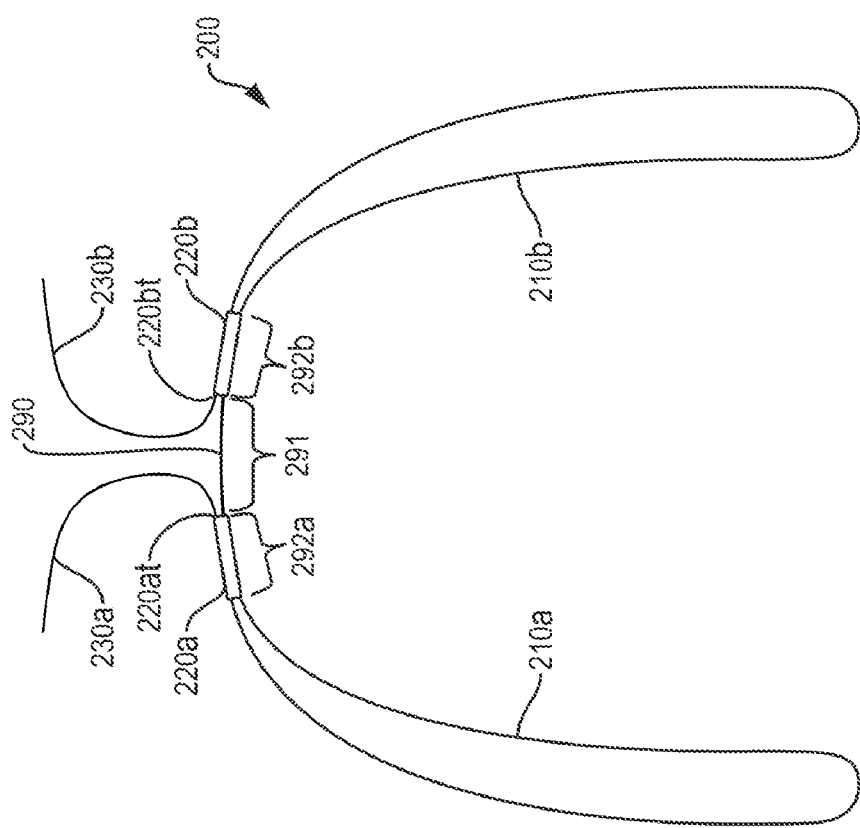
FIG. 2 is a schematic side view of the multi-loop tensionable suture construct of FIG. 1.

FIG. 2 is a schematic illustration of the multi-loop tensionable suture construct 200 of FIG. 1 without anchors. The length of the spanning portion 290 is indicated (e.g., region 291) as the length of suture between the first and second adjustment mechanisms 220a, 220b, and more specifically the length between proximal terminal ends 220at, 220bt of the adjustment mechanisms 220a, 220b. The length of each first and second adjustment mechanisms is also indicated (e.g., regions 292a, 292b) as the length of suture between the spanning portion 290 and the entrance of the tail 230a, 230b into the respective adjustment mechanism 220a, 220b on the side of the adjustment mechanism forming the loop. In some non-limiting embodiments, the adjustment mechanisms 220a, 220b can have lengths approximately in the range of about 1 mm to about 10 mm, or approximately in the range of about 3 mm to about 5 mm (e.g., finger trap configurations where the trap is elongated to provide additional strength and locking). A person skilled in the art will appreciate other lengths are possible, depending, at least in part, on the type of procedure being performed, the anatomy of the patient, and/or the preference of the surgeon, among other factors appreciated by the skilled person. The spanning portion can include a visible mark, such as a different color and/or pattern (e.g., stripes) to distinguish the center of the suture construct 200 during cinching of the loops in a constrained surgical environment and enable a user to center the spanning portion between openings in tissue into which the loops 210a, 210b (and, in some instances some or all of the adjustment mechanisms 220a, 220b) extend.

Figure 3:
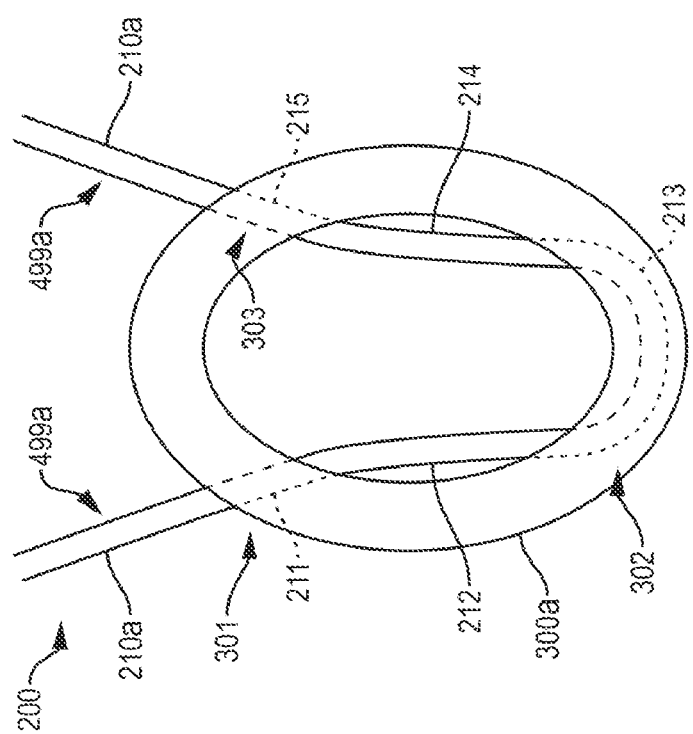
FIG. 3 is a schematic side view of an example soft anchor in use with the multi-loop tensionable suture construct of FIG. 1.

FIG. 3 illustrates one example soft anchor 300a in use with the multi-loop tensionable suture construct 200 of FIG. 1. The soft anchor 300a can have a generally round and/or toroidal arrangement of material, with one or more passages, as shown three passages 301, 302, 303, where suture can pass through the anchor. In the illustrated embodiment a first passage 301 and a third passage 303 are arranged on either side of the passage 302. The first and third passage 301, 303 can be arranged to allow suture to pass from an outside surface (e.g., facing away from the anchor 300a) to an inner surface (e.g., facing inwards toward another inner surface portion of the anchor 300a). The second passage 302 can be arranged as a tunnel that extends between one inner surface location to another, functionally causing a suture disposed therein to reverse direction. In operation, and as illustrated in FIG. 3, the suture of the first loop 210a of the suture construct 200 extends into the anchor 300a through the first passage 301 (e.g., portion 211), then spans an inner portion of the anchor (e.g., portion 212) and into the second passage 302 (e.g., portion 213), where the suture leaves and spans the inner portion again (e.g., portion 214) to pass through the third passage 303 (e.g., portion 215) and back out of the anchor 300a. Additionally, and as shown in FIG. 3, the first additional length of suture 499a can be coupled with the first anchor 300a via the same passages 301, 302, 303 as the flexible member of the first loop 210a. The passages 301, 302, 303 can the suture to slide though such that the anchor 300a can move along the suture and/or the suture can move through the anchor 300a.

Figure 4:
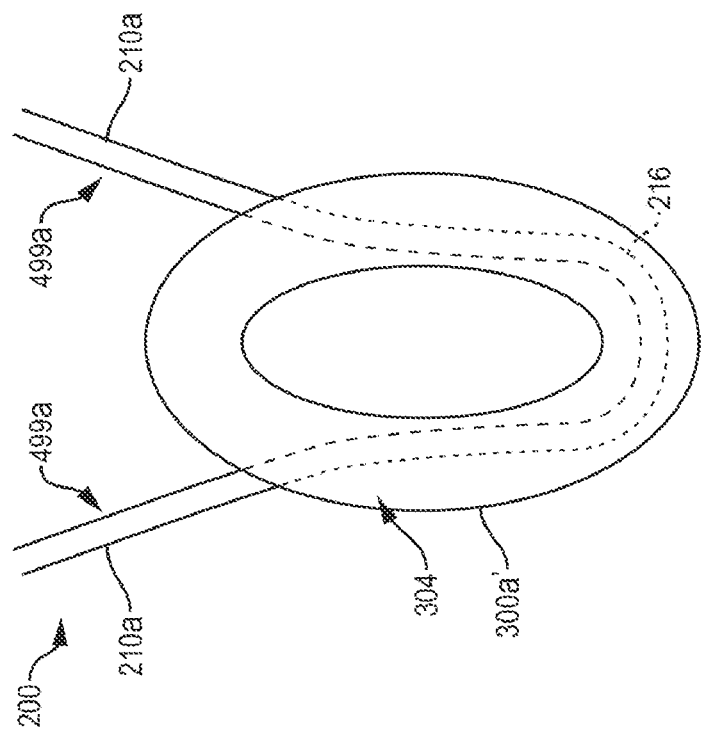
FIG. 4 is a schematic side view of another example soft anchor in use with the multi-loop tensionable suture construct of FIG. 1.

FIG. 4 illustrates another example soft anchor 300a' in use with the multi-loop tensionable suture construct 200 of FIG. 1. The soft anchor 300a' includes a single passage 304 that extends between two outer locations of the soft anchor 300a' and can, as illustrates, extend through a majority of the soft anchor 300a' such that the passage 304 enables the suture to reverse direction to enter and exit the soft anchor 300a' from a generally same side (e.g., upper, with respect to the figure) and extend through an opposite side (e.g., lower, with respect to the figure) to secure the soft anchor 300a' to the suture. In the same fashion as with the soft anchor 300a of FIG. 3, the soft anchor 300a' of FIG. 4 can have the first additional length of suture 499a extend through the passage 304. FIGS. 3 and 4 illustrate two possible arrangements, but others (such as, but not limited to suture paths for both the loops of suture 200 and setting sutures 499 which traverse through, within, and around the anchor 300 at multiple locations) are possible and are included herein.

In both of the anchor examples of FIG. 3 and FIG. 4, the anchors 300a, 300a' can be coupled with the one or more sutures during manufacturing of the anchors 300a, 300a' and/or sutures can be threaded though the passages 301-304 before use. Further, a person skilled in the art will appreciate a variety of other configurations and techniques that can be used to associate the construct 200, or other constructs provided for herein or otherwise derivable from the present disclosures, and many different types of anchors. The construct 200 and sutures 499a, 499b can pass into and out of any number of passages formed in or otherwise provided as part of the anchors.

Figure 5B:
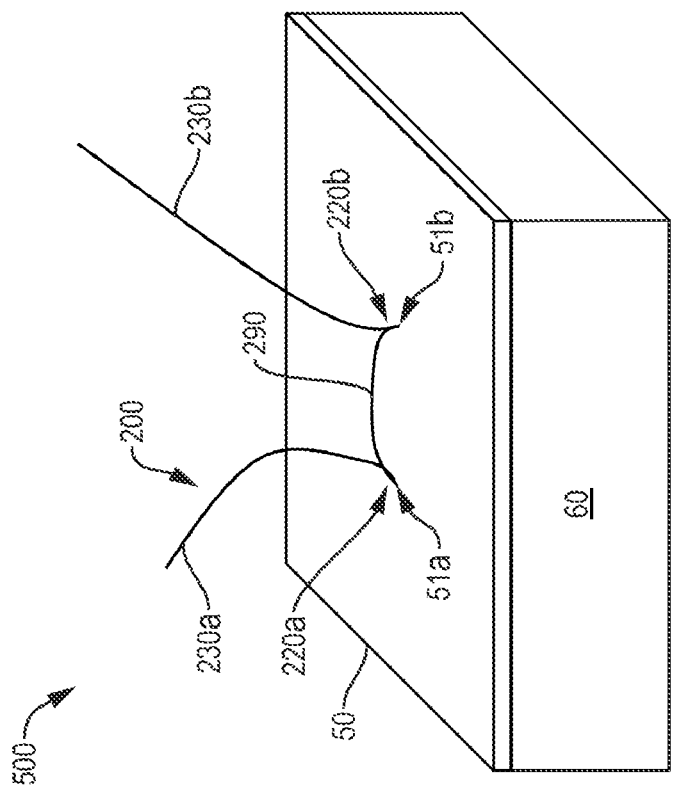
FIGS. 5A and 5B are schematic perspective views of the multi-loop tensionable suture constructs of FIG. 1 spanning between multiple suture anchors, including the suture anchor of FIG. 3, in an installed configuration.
Figure 5A:
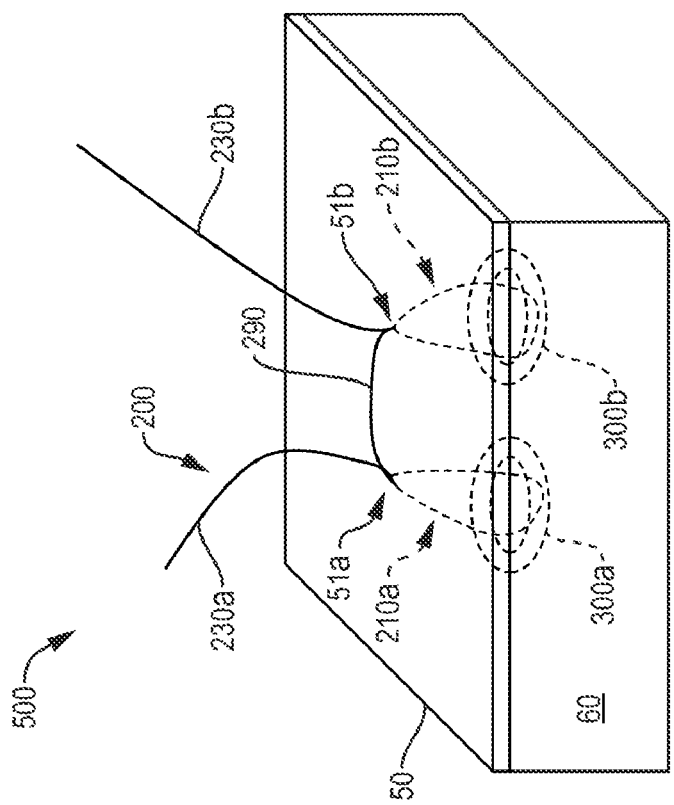

FIGS. 5A and 5B are illustrations of the multi-loop tensionable suture construct 200 spanning between multiple suture anchors 300a, 300b in an installed configuration. The anchor 300b can be of a similar nature as the suture anchor 300a, though they can be different configurations or altogether different anchor types (e.g., one can be a soft anchor and another can be a hard anchor). In FIG. 5A, a surgical implant 500 that includes the suture construct 200 and the first and second anchors 300a, 300b is installed in tissue 50, 60. As shown, a soft tissue 50 is above a second tissue 60, which can be bone, and the first and second anchors 300a, 300b are each disposed in respective separate locations in the second tissue 60. FIG. 5A shows the tissues 60 as translucent to allow the anchors 300a, 300b and loops 210a, 210b to be illustrated, and FIG. 5B shows the tissues 50, 60 as opaque to better illustrate the arrangement of the construct 200 above the soft tissue 50 in practice. Returning to FIG. 5A, from each anchor 300a, 300b, the loop portion 210a, 210b can extend through the soft tissue 500. More particularly, the first loop portion 210a can extend through a first location 51a and the second loop portion 210b can extend through a second location 51b. The spanning portion 290 can extend across a face of the soft tissue 50 and can connect the loop portions 210a, 210b. In operation, each anchor 300a, 300b, with respective loop portions 210a, 210b of the suture construct 200 coupled thereto, can be passed through the soft tissue 50 and into the second tissue 60. Afterwards, the tails 230a, 230b can be pulled either simultaneously, or sequentially to cinch the loops 210a, 210b and draw the spanning portion 290 against the face of the soft tissue 50. In FIG. 5B, the location of the adjustment mechanisms 220a, 220b is more easily seen as being adjacent to or generally abutting, or even passing into, the respective locations 51a, 51b where the loop portions 210a, 210b extend through the soft tissue 50 and connect to the anchors 300a, 300b. Included herein are also examples including placing and fixing the anchors within a single tissue layer (such as 50), through and beyond both of two tissue layers (such as 50 and 60), and/or into or through and beyond a third or fourth, or subsequent tissue layer.

Example techniques for using the surgical implants 100, 500, and other implants provided for herein or otherwise derivable from the present disclosures, are now described in the context of FIG. 5A. Related disclosures are also provided further below at least with respect to FIGS. 15A-15G, such disclosures focusing more on the insertion instrument than the implant. First, the soft tissue 50 to be repaired can be pierced by passing a sharp tip of an insertion instrument through the soft tissue 50. Next, a location in the second tissue 60 (e.g., bone) can be located where the first anchor 300a is to be implanted. A hole can then be created in the second tissue 60 at a desired location for the first anchor 300 (e.g., by hammering an insertion tool to appropriate depth into bone). A central sharpened core of the insertion tool may be removed next (depending on the type of instrument and/or anchor used), leaving an outer portion of the insertion tool in the hole in the second tissue 60, after which the first anchor 300a can be loaded onto an insertion tool and advanced into the hole in the second tissue 60. The insertion tool is then removed, leaving the first anchor 300a in the hole. This process is repeated for the second anchor 300b at a different location, after which the spanning portion can be tensioned against the soft tissue 50 by pulling on the tails 230a, 230b to cinch the loops 210a, 210b. As explained in FIGS. 6-7B, this process can be repeated multiple times with additional anchors and suture constructs for a connected chain across all of the implanted anchors, with spanning portions bridged across the soft tissue 50 between each anchor location. Included herein are also examples for creating holes through and/or into tissue with the anchors themselves at the end of insertion tools, and/or with insertion tools on which the anchors are held after which removal of the tool leaves the anchor in place (without requiring a separate step of creating a hole first, and/or without requiring temporarily leaving any portion of the insertion tool in the tissue prior to placing the anchors, and without requiring a subsequent step of placing the anchor).

Figure 6:
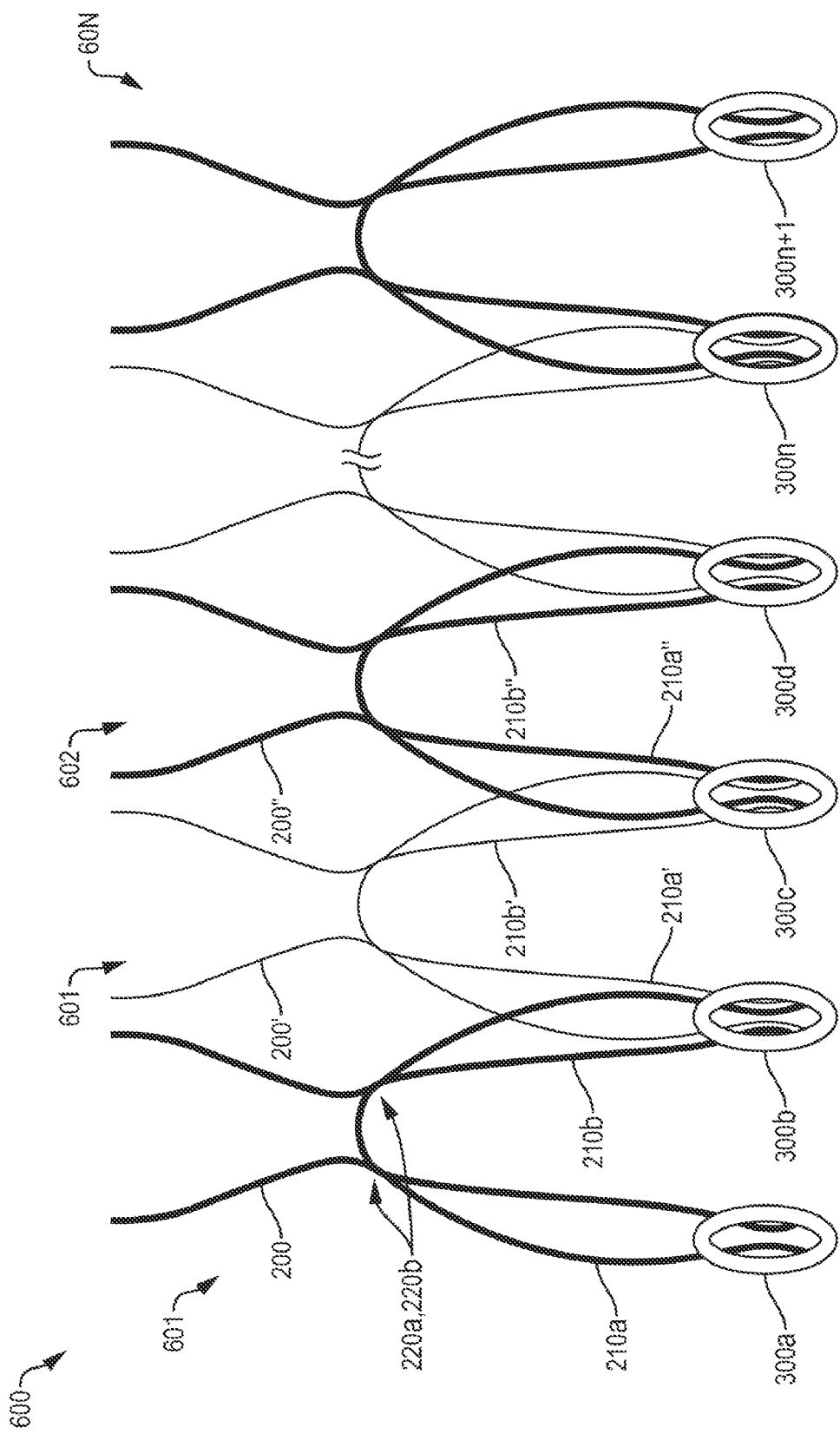
FIG. 6 is a schematic side view of one exemplary embodiment of a plurality of multi-loop tensionable suture constructs spanning a sequence of anchors, including the multi-loop tensionable suture construct of FIG. 1 and the suture anchor of FIG. 3.

FIG. 6 is a schematic side view of one exemplary embodiment of a plurality 600 of multi-loop tensionable suture constructs connected in overlapping series to a sequence of anchors. In FIG. 6, the plurality 600 includes a first implant 601 that includes a first suture construct 200 and first and second anchors 300a, 300b. The plurality also includes second and third implants 601, 602, up to an $N^{th}$ implant (e.g., 60N), each with a loop portion 210a', 210a'' coupled with a second anchor of the previous implant and a loop portion 210b', 210b'' coupled with a first anchor of the next implant. Accordingly, the first anchor 300a of the first 601 is coupled to only a single construct 200, as is the second anchor 300n+1 of the final implant 60N, with all intervening implants coupled with one anchor of each adjacent implant. Examples also include using a plurality of multi-loop constructs (such as the plurality 600) to have the first and final implants connected to one another with a multi-loop tensionable suture construct similarly to the other adjacent pairs of anchors in FIG. 6, and/or to have additional anchors or pluralities of anchors similar to the plurality 600 connected via multi-loop tensionable suture constructs to one or more of the anchors in the plurality of multi-loop constructs. In this way, to create the different pluralities of multi-loop constructs described, a given anchor or anchors within such a construct can have more than two multi-loop tensionable suture loops associated with it. Each construct 200 can include first and second adjustment mechanisms 220a, 220b, as discussed herein. The anchors are labeled individually (e.g., 300a-d, 300n, 300n+1) but their association with a respective implant can be, but does not have to be, established before insertion. For example, before the insertion of the second anchor 300b of the first implant 601, the first loop 210a' can be coupled with the first anchor 300a. Thus, for each subsequent suture construct after the first may come pre-installed with only a single 'second' anchor, and a loop portion that is configured to be coupled with a second anchor of an adjacent implant. Alternately, the entire plurality 600 can be manufactured together and provided as a set with a predetermined number of implants, with each connection between the loops and anchors already established. Further, alternatively, an implant can be coupled to an anchor that is already implanted to form at least a portion of the plurality 600 of multi-loop tensionable suture constructs.

Figure 7A:
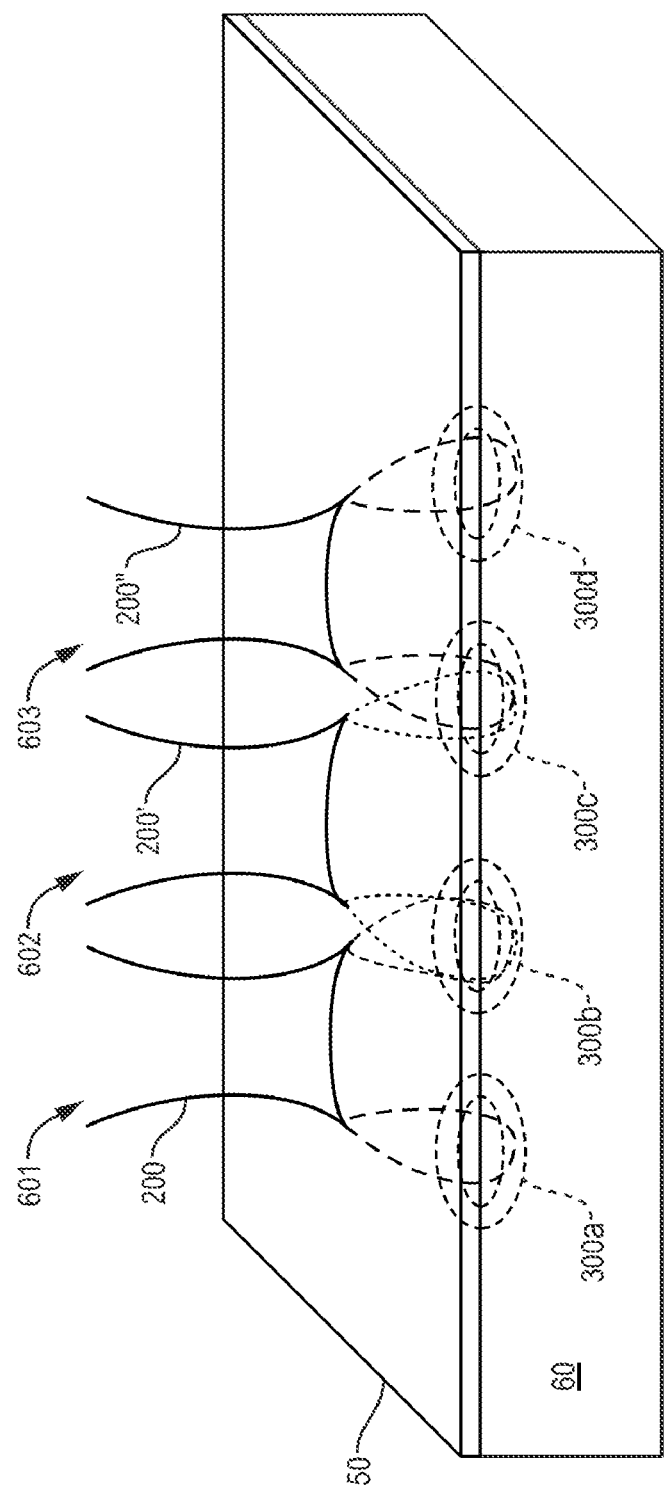

FIGS. 7A and 7B are illustrations of an installation of a plurality of implants 601, 602, 603 each with a multi-loop tensionable suture construct 200, 200', 200" arranged to span across sequence of anchors 300a, 300b, 300c, 300d, with the anchors 300a, 300b, 300c, 300d disposed in a second tissue 60 and the constructs 200, 200', 200" spanning across a soft tissue 50 above the second tissue 60. The anchors 300c, 300d can be of a similar nature as the suture anchors 300a, 300b, though they can be different configurations or altogether different anchor types (e.g., one or more can be a soft anchor and one or more others can be a hard anchor). In some embodiments, the anchors can be all suture anchors, toggle anchors, or other suitable anchors for anchoring tissue to bone. Similar to FIG. 5A, in FIG. 7A the first and second tissues 50, 60 are translucent to show the anchors 300a, 300b, 300c, 300d in the second tissue. Each construct 200, 200', 200" can be arranged with respect to two of the anchors 300a, 300b, 300c, 300d in the same manner as described above with respect to FIGS. 5A and 5B. In FIG. 7A, each construct 200, 200', 200" can pierce the soft tissue 50 at two unique locations, which is optional, as it is also possible for the loop of an adjacent construct to pierce the soft tissue at a same location as, as illustrated in FIG. 7B. In the illustrated embodiment, together the suture constructs 601, 602, 603 define a cinchable construct with three spans and four anchor points.

One example technique for using the surgical implants 601, 602, 603 is now described in the context of FIG. 7A. First, anchors 300a-d that have attached sutures or suture loops which span between pairs of anchors are sequentially passed through soft tissue 50 and into bone 60. After the placement of the first anchor in this way, a second anchor can be placed in this way, at which point the associated suture ends 200 can be tensioned to tighten the span between the first two anchor. Alternatively, the suture ends 200 can be left un-tensioned until a later time. After placement of a third anchor in the same way as placement of the first and second anchors, the suture ends 200' can be tensioned, or left as un-tensioned until later. Subsequent anchors can be placed as desired with the suture ends 200", etc. being tensioned after placement of each subsequent anchor, or being left un-tensioned. After placement of all of the anchors in the plurality of multi-loop constructs, any suture ends left un-tensioned can be tensioned as desired to tighten the spans between the respective pairs of anchors placed.

Figure 9:
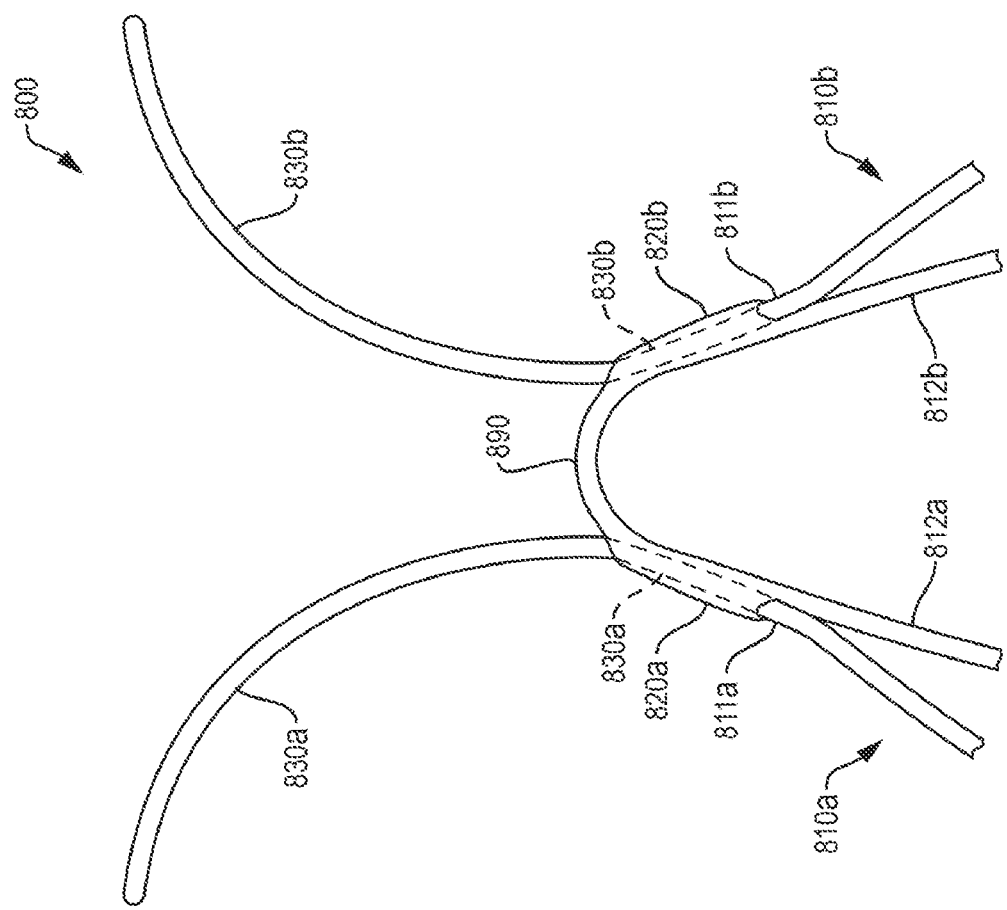
FIG. 9 a photograph providing a side view of a knotless loop arrangement of the multi-loop tensionable suture of FIG. 8.

FIG. 8 is a photograph of an example implant 80 having a multi-loop tensionable suture construct 800 spanning between multiple soft suture anchors 83a, 83b. The suture construct 800 is made from a single length of suture 801 that is formed into two separate loops sections 810a, 810b by passing each tail 830a, 830b of the suture 801 through a finger trap 820a, 820b. The finger traps 820a, 820b are formed in adjacent regions of the suture 801 with a spanning portion 890 extending between. Each soft anchor 83a, 83b is slidably disposed on a respective one of the loops 810a, 810b, in a manner as described in FIG. 3. An additional length of suture 999a, 999b is also threaded through each soft anchor 83a, 83b alongside the respective loop portion 810a, 810b. The additional lengths of suture 999a, 999b can perform functions similar to the additional lengths of suture 499a, 499b of FIG. 1. FIG. 9 shows the finger trap adjustment mechanisms 820a, 820b in more detail. Each finger trap 820a, 820b can include a substantially stationary trap formed in suture portions 812a, 812b flanking the spanning portion 890. The stationary trap is a region through which a moving portion 811a, 811b of the suture is passed through, with the length of suture extending from the trap opposite the loop portion 810a, 810b being the tensionable tails 830a, 830b that can be pulled to cinch the loops 810a, 810b.

Alternatively, knots can be used for the construction of the loops 810a, 810b of the construct 800, which enables non-spliceable suture to be used to make the constructs 200, 800. Even if the suture is spliceable, the construct 800 configuration can be such that no splices are used, at least with respect to where the adjustment mechanisms 820a, 820b are located. The use of knots as opposed to splices can provide enhanced security and greater versatility for manufacturing a one-way constricting loop in at least some instances at least because it allows for the use of sutures that are not compatible with alternative locking mechanisms, such as splices, among other benefits. Accordingly, examples of the knots provided for herein can be described as being unspliced since they do not contain splices as previously used in medical applications. Adjustment mechanisms 820a, 820b, generally, can include a variety of mechanisms, including self-locking mechanism, and self-locking mechanisms can include, for example, splices, finger traps, knots, and other arrangements known to those skilled in the art.

The adjustment mechanisms 820a, 820b can be formed on the filament 801 in many different manners. In the illustrated embodiment, shown in detail in FIG. 9, the adjustment mechanisms 820a, 820b are finger traps. More generally, the adjustment mechanisms 820a, 820b can also be knots, such as a type of running knot and/or single strand single loop slipknots. These adjustment mechanisms 820a, 820b, when arranged in a construct like the construct 800, can exhibit a self-locking behavior due to, for example, tension on the spanning portion 890 pulling both sleeve portions of the finger traps as the loops 810a, 810b are tensioned and cinched. The illustrated embodiments are by no means limiting on the type and/or number of adjustment mechanisms 820a, 820b that can be used as knots in conjunction with the suture constructs (e.g., constructs 200, 800) provided for herein to achieve the desired functionality of the constructs. The finger traps shown in FIG. 9, as well as knots, are some non-limiting examples of self-locking adjustment mechanisms and self-locking mechanisms, and adjustment mechanisms more generally can be used in lieu of the finger traps and knots described herein. A person skilled in the art, in view of the present disclosures, will recognize other adjustment mechanisms 820a, 820b that are suitable for use in conjunction with the constructs and implants of the present disclosure, such as, for example, tooth and pawl arrangements, which can advantageously be used with mono-filament flexible members (e.g., sutures) where splicing may not be possible due to the mono-filament nature of the flexible member.

Manipulation of the single flexible member to form each of the tails 830a, 830b, the loop portions 810a, 810b, the adjustment mechanisms 820a, 820b, and spanning portion 890 can be achieved in a variety of manners. The order by which the various features (e.g., tails, loop portions, adjustment mechanisms, spanning portion, etc.) of the construct 800 are formed is not typically critical. As generally shown, the single flexible member includes two terminal ends, which end up being the tails 830a, 830b. In one exemplary embodiment, the flexible member extends from the first tail 830a, is formed into the first loop 810a by being passed back through the first adjustment mechanism 820a formed into the suture. Additionally, a second tail is formed into the second loop 810b by being passed back through the second adjustment mechanism 820b formed into the suture.

While the example of FIG. 8 illustrates the adjustment mechanisms 820a, 820b as a finger trap arrangement, other configurations are possible. One such example is the use of a FIG. 8 noose knot or an extended FIG. 8 noose knot to form the loop portions. In operation, a tail is free to be pulled through the FIG. 8 noose knot to constrict the loop portion. By applying tension on the constricting tail (e.g., the suture forming the spanning portion), the suture construct can be placed in a locked configuration. Another example construct includes a suture tied with a prusik-style knot to form a loop portion, a constricting tail to form the spanning portion, and a sliding tail to provide cinching of the loop. The prusik-style knot can be created, for example, by piercing the end of the suture through a central portion of the suture. In operation, the sliding tail is free to be pulled through the prusik-style knot to constrict the loop portion. By applying tension on the constricting tail (e.g., the spanning portion by tightening both loops), the suture construct can be placed in a locked configuration. The use of the knots permits greater versatility for manufacturability of the one-way constricting loop constructs 400 by enabling the use of sutures 500 that are not compatible with alternative locking mechanisms (e.g., splices). One such example is sutures with solid cores, such as DePuy Synthes Dynacord™ suture, available from DePuy Synthes Sports Medicine (Mitek) of Raynham, MA. Dynacord™ suture is constructed with a solid core that is provided for the ability of the suture to contract when hydrated. Additional information about such suture configurations is provided at least in U.S. Pat. No. 8,870,915 to Mayer et al., the contents of which is incorporated by reference herein in its entirety. The contraction behavior of the constructs provided for herein (e.g., the implant 100 and/or construct 200, 800) may be used in conjunction with the Dynacord™ technology to resist losses of the repair due to creep, reapproximate tissue between which a gap has formed, and/or maintain a compressive force on approximated tissue. The presence of a solid core and its typical intimate relationship with the braid of the suture can provide appeal for locking mechanisms such as knots that are external to the core of the suture.

In the illustrated embodiment of FIG. 8 the surgical construct 800 is formed from a single flexible member. A person skilled in the art will understand the disclosures provided for herein can be adapted for formation using multiple flexible members though. For example, in some instances, a bridge portion akin to the spanning portion 890 can be formed by tying or otherwise connecting two separate flexible members together, each flexible member having one knot, one looped portion, and one sliding tail, akin to the adjustment mechanisms 820a, 820b, looped portions 810a, 810b, and sliding tails 830a, 830b, formed therein. The bridge portion can be a third flexible member or a terminal end of one of the first and second flexible members that form the first and second looped portions 810a, 810b. The use of a single flexible member can provide benefits in ease of manufacturing and/or formation, strength, and reliability, among others. The use of multiple flexible member types can provide benefits in adaptability of the construct 800 for more easily having different performance characteristics at different locations along the construct.

The surgical constructs and implants provided herein can be used in a variety of procedures to secure a soft tissue graft to bone. One common procedure is the repair of a torn or ruptured rotator cuff in a patient's shoulder.

Examples of the present disclosure also include suture constructs contained in sterile packaging in a ready-to-use configuration. This includes options such as having multi-loop tensionable constructs assembled with multiple anchors, each anchor of which is on its own inserter shaft, and having those shafts assembled together into an insertion instrument. The instrument, inserter shafts, constructs, and anchors can be clean and sterile and can be held in a thermo-formed or other such tray, and further, can be contained within a single pouch or within multiple pouches and held in a box to serve as a barrier to keep the ready-to-use full assembly clean and sterile and easily handled between its final packaging at a company manufacturing site. The packaging can then be opened and used for a single treatment case in an operating room or surgical center procedure room after which the non-implanted components can be appropriately discarded and/or broken down for recycling. Another option includes having one or more of the multi-loop tensionable constructs, the inserter shafts, the insertion instrument, or other sub-components of the implant and instrument components packaged separately from other components or sub-components. In the first-described option, all of the components can be transported together and presented to the surgeon in a single package without the need for assembly. In the second-described option, some components, such as the inserter shafts or insertion instrument, may be packaged in a non-sterile manner and provided for cleaning and sterilization at the hospital or surgical center site. In this scenario within the second option, after each treatment case use, or otherwise, as needed, the re-usable instrument components can be re-cleaned and re-sterilized for subsequent re-use. Further, in this second option, some assembly (such as of the implants onto inserter shafts, perhaps) can be required, for example after opening possibly separate packages, and prior to using the instruments and implants in a treatment case. Also in this second option, the components can be transported in different packages and for a particular treatment case, the surgeon can decide what instrument and implant components may be needed, and can instruct that only those components be prepared and brought to the site of the treatment case.

As discussed herein, at least some portion of the constructs and instruments disclosed herein can be designed to be disposed of after a single use, and/or at least some portion of the constructs and instruments can be designed to be used multiple times. In either case, however, the instruments can be reconditioned for reuse after at least one use. Reconditioning can include any combination of the steps of disassembly of the instruments, followed by cleaning or replacement of particular pieces, and subsequent reassembly. In particular, the instrument can be disassembled, and any number of the particular pieces or parts of the instrument can be selectively replaced or removed in any combination. Upon cleaning and/or replacement of particular parts, the instrument can be reassembled for subsequent use either at a reconditioning facility, or by a surgical team immediately prior to a surgical procedure. Those skilled in the art will appreciate that reconditioning of an instrument can utilize a variety of techniques for disassembly, cleaning/replacement, and reassembly. Use of such techniques, and the resulting reconditioned instrument, are all within the scope of the present application.

Preferably, the invention described herein will be processed before surgery. First, a new or used instrument and/or construct is obtained and if necessary cleaned. The instrument and/or construct can then be sterilized. In one sterilization technique, the instrument and/or construct is placed in a closed and sealed container, such as a plastic or TYVEK bag. The container and instrument and/or construct are then placed in a field of radiation that can penetrate the container, such as gamma radiation, x-rays, or high-energy electrons. The radiation kills bacteria on the instrument and/or construct and in the container. The sterilized instrument and/or construct can then be stored in the sterile container. The sealed container keeps the instrument and/or construct sterile until it is opened in the medical facility.

It is preferred that the instrument and/or construct is sterilized. This can be done by any number of ways known to those skilled in the art including beta or gamma radiation, ethylene oxide, steam, and a liquid bath (e.g., cold soak).

Example Insertion Devices

Figure 10A:
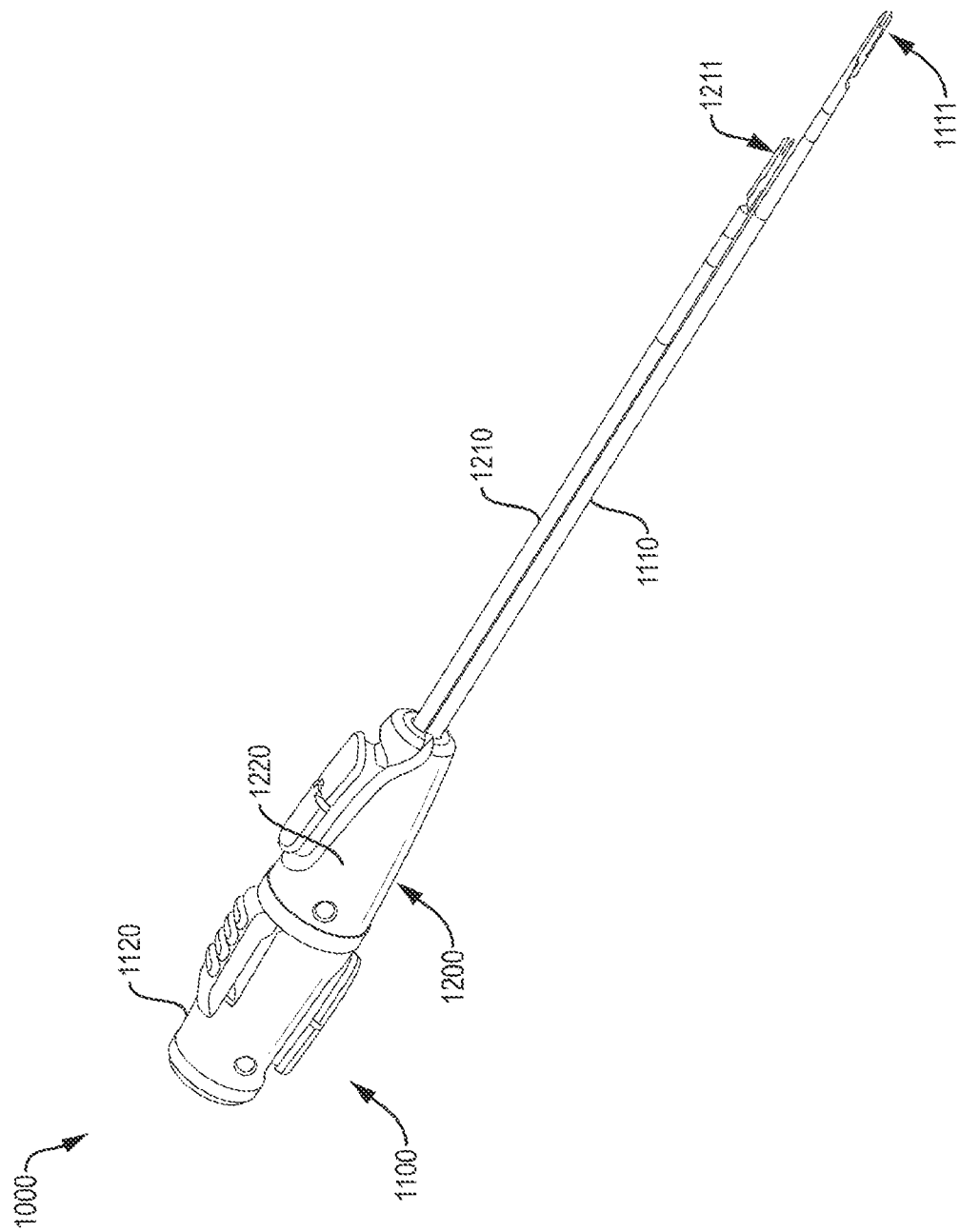
FIG. 10A is an isometric view of a dual insertion instrument for use in installing embodiments of the multi-loop tensionable suture constructs disclosed herein.

FIGS. 10A-15G present example surgical instruments for installing suture implants, such as the implants 80, 100, 500, 600, disclosed herein or otherwise derivable from the present disclosures. FIG. 10A is an isometric view of a dual insertion instrument 1000 for use in installing embodiments of the multi-loop tensionable suture constructs disclosed herein. The instrument 1000 is referred to as a dual insertion instrument because the instrument 1000 can be an assemblage of a first insertion device 1100 and a second insertion device 1200, with first and second referring to their arrangement for providing for the insertion of a first anchor with the first device 1100 and then, as discussed below, reconfiguration for subsequent insertion of a second anchor via the second insertion device 1200. In some examples, each of the first and second insertion devices 1100, 1200 can be individual sub-assemblies of a surgical instrument assembly that includes both the first and second sub-assemblies, with each sub assembly having, for example, a handle and shaft components. The first insertion device 1100 can include a first proximal handle 1120 and a distally extending first insertion shaft 1110. The second insertion device 1200 can include a second proximal handle 1220 and a distally extending second insertion shaft 1210. FIG. 10A illustrates the first and second insertions devices 1100, 1200 coupled together, with the first and second handles 1120, 1220 combined to from a single handle arrangement. The two insertion shafts 1110, 1210 can extend together from the combined handles 1120, 1220, with the first distal tip 1111 of the first insertion shaft 1110 extending beyond the second distal tip 1211 of the second insertion shaft 1210 to enable use of the first distal tip 1111 without interference from the second distal tip 1211 while the first and second devices 1100, 1200 are combined. The first and second distal tips 1111, 1112 can be configured to hold and insert an anchor into tissue. The first and second insertion shafts 1110, 1210 can be arranged approximately parallel to each other and co-extensive along their overlapped portions (e.g., between the handles and the second distal tip 1211).

Figure 10B:
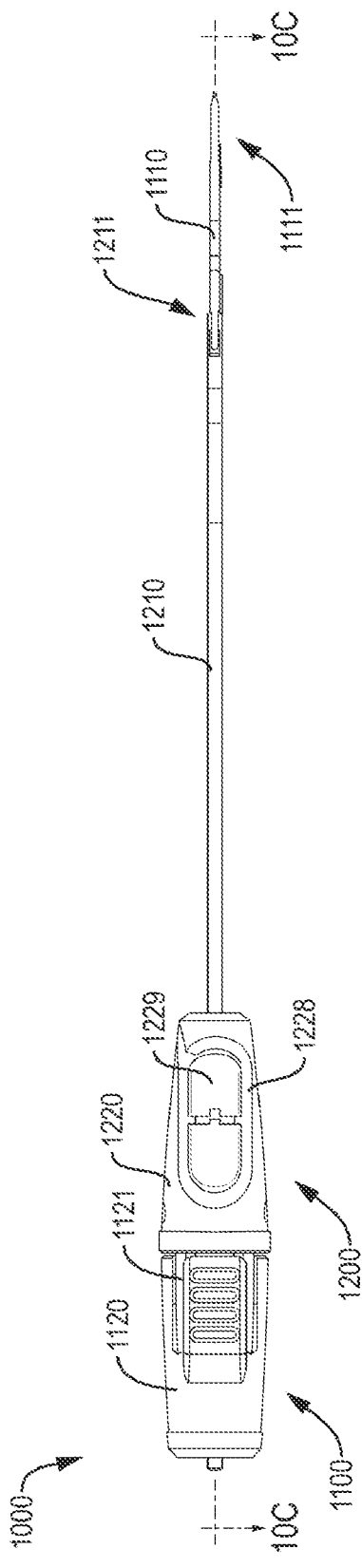
FIG. 10B is a top view of the dual insertion instrument assembly of FIG. 10A.
Figure 10C:
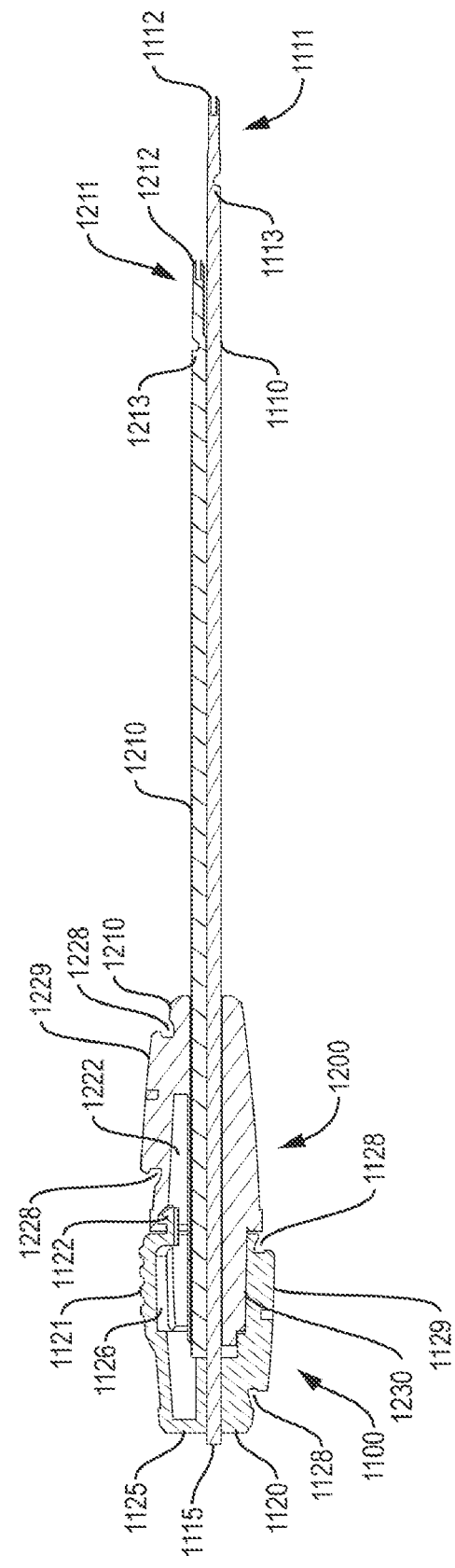
FIG. 10C is a cross-section view of the dual insertion instrument assembly of FIG. 10B taken along line C-C.

FIG. 10B is a top view of the dual insertion instrument assembly 1000 and shows a second spindle 1229 with a wrap-around channel 1228 on the second proximal handle 1220 that can be used for managing suture extending from an anchor held by the second distal tip 1211. Also shown is an example of a latch mechanism formed by a flexible portion 1121 of the first proximal handle 1120, which can be used to control securing of the handles 1120, 1220 together, as shown in FIG. 10C. FIG. 10C is a cross-section view of the dual insertion instrument assembly 1000 and more clearly shows the arrangement of the insertion shafts 1110, 1210 and the coupling of the handles 1120, 1220. Starting with the handles, the first proximal handle 1120 can hold a proximal end of the first insertion shaft 1110, with a proximal terminal end 1115 of the first insertion shaft 1110 extending proximal from a proximal end 1125 of the first proximal handle 1120. This arrangement can allow for striking of the insertion shaft 1110 with a hammer or other tool to facilitation insertion of the first distal tip 1111 into hard tissue, such as a bone. The first proximal handle 1120 can also include a first spindle 1129 with a wrap-around channel for managing suture extending from an anchor held by the first distal tip 1111.

As shown in FIG. 10C, a proximal extension 1230 of the second proximal handle 1220 can extend into a distal-opening cavity 1126 of the first proximal handle 1120 to more completely engage (e.g., rotationally and otherwise lock) the two handles when coupled and improve their feel to the user as a single handle. The flexible portion 1121 of the first proximal handle 1120 can control the engagement of a latch 1122 that extends into a proximal-opening recess 1222 of the second proximal handle 1220 and, when latched, can maintain the assembled configuration of the first and second handles 1120, 1220 together. Depressing the flexible portion 1121 toward the center axis of the first handle 1120 can disengage the latch 1122 and allow the first insertion device 1100 to be decoupled and withdrawn from the second insertion device 1200, as shown in more detail in FIGS. 12A and 12B. Continuing to refer to FIG. 10C, the first insertion shaft 1110 can extend through the second handle 1220 to extend distally alongside (and beyond) the second insertion shaft 1210. The distal tip 1111, 1211 of each insertion shaft 1110, 1210 can include a terminal notch 1112, 1212 configured to hold an anchor, such as the soft anchors illustrated herein, and the shafts can further include notches 1113, 1213, for example proximal to the terminal notches 1112, 1212, that can act as a seat for a portion of the anchor to sit when carried by the insertion shaft prior to and during insertion. The distal tips 1111 and 1211 can also be configured to allow piercing of tissue (e.g., by terminating in pointed ends). This can enable the insertion and placement of anchors such as those in assembly 80 to be performed directly into and/or through soft tissue and into and/or through bone tissue without requiring the prior preparation or creation of a hole.

Figure 11B:
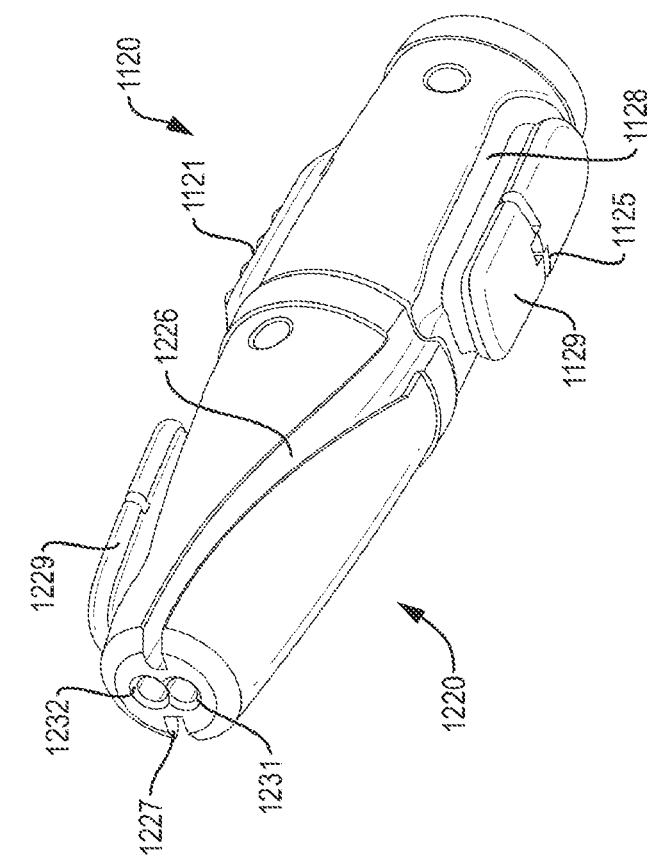
FIGS. 11A and 11B are isometric views of the two-handle assembly of the of the dual insertion instrument assembly of FIG. 10A.
Figure 11A:
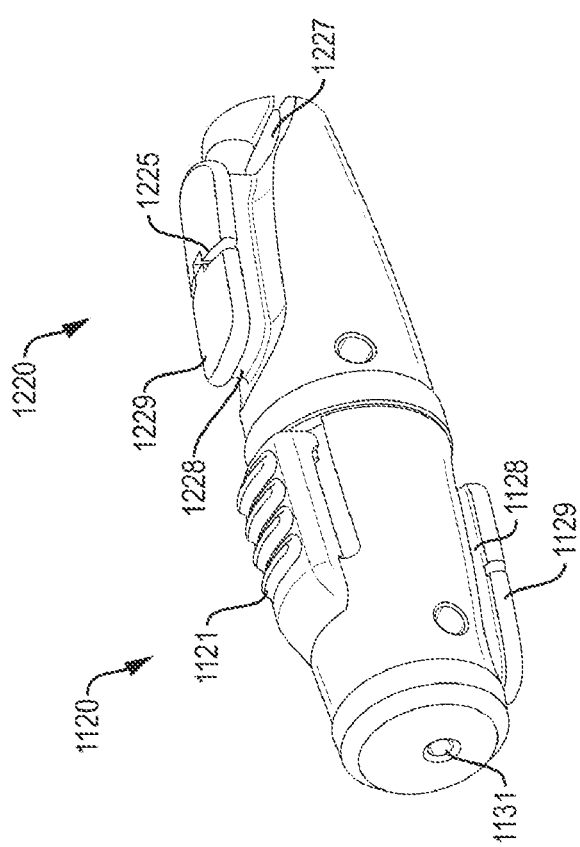

FIGS. 11A and 11B show the first and second proximal handles 1120, 1220 coupled together and viewed from two different angles. As shown in FIG. 11A, a channel 1227 extends distally from the channel 1228 of the second spindle 1229 of the second handle 1220, thus providing a path within and along which the suture from an anchor of an assembly such as 80 held on insertion shaft 1210 (not shown) can be placed and thereby managed on the second spindle 1229 to extend to the insertion shaft 1120 (not shown). On the other side, as shown in FIG. 11B, another channel 1226 can extend along the entire second handle 1220 to connect the channel 1128 of the first spindle 1129 of the first handle 1120 to the proximal end of the second handle 1220 and thereby provide a passage within and along which additional suture from an anchor of an assembly such as 80 held on insertion shaft 1110 (not shown) can be placed and thereby managed on the first spindle 1129. Arrangement of the sutures in this way can serve to hold them securely against being inadvertently prematurely dislodged from the inserter assembly 1000 such as might otherwise occur if the suture were contacted by the hand of a user holding the assembly 1000. Also visible in FIG. 11B are the two passageways 1232, 1231 (e.g., bores) through which the first and second insertion shafts 1110, 1210 can extend through, and distally out of, the second handle 1220. The first insertion shaft 1110 can extend out of the first bore 1231 and the second insertion shaft 1210 can extend out of the second bore 1232. Returning to FIG. 11A, a bore 1131 of the first handle 1120 is shown which can be used for holding the first insertion shaft and allowing the proximal end to extend proximally from the first handle 1120.

Figure 12A:
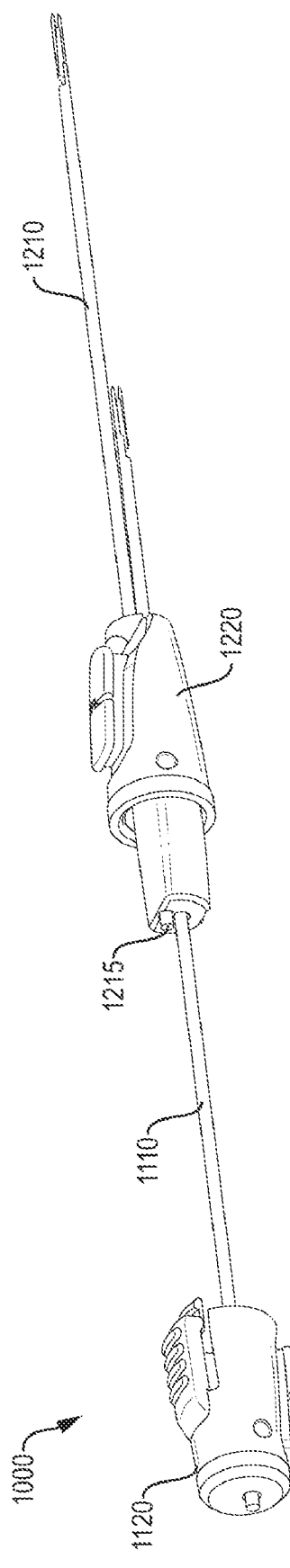
FIG. 12A is an isometric views of the two-handle assembly of the dual insertion instrument assembly of FIG. 10A with the handles partially separated.
Figure 12B:
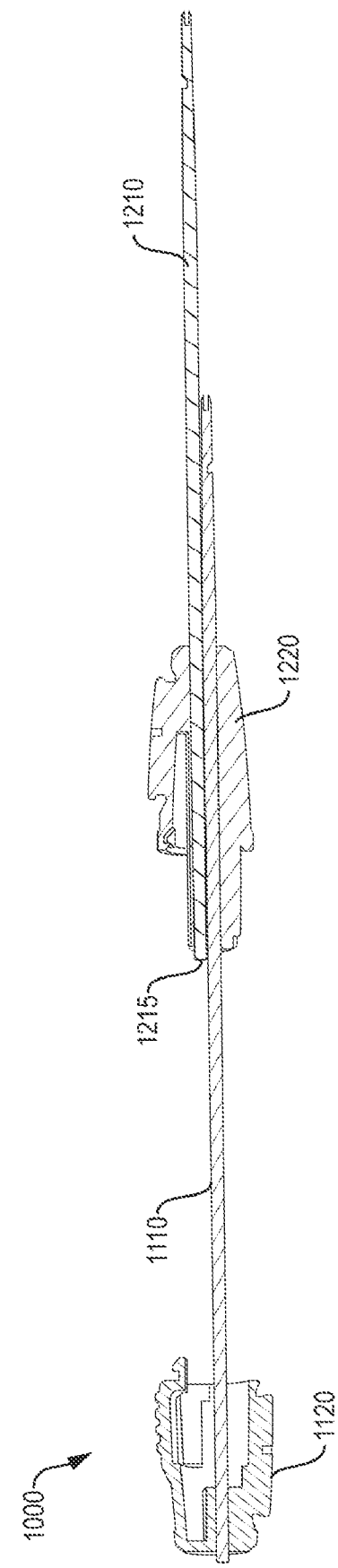
FIG. 12B is a cross-section view of the dual insertion instrument assembly in the arrangement of FIG. 12A.
Figure 12C:
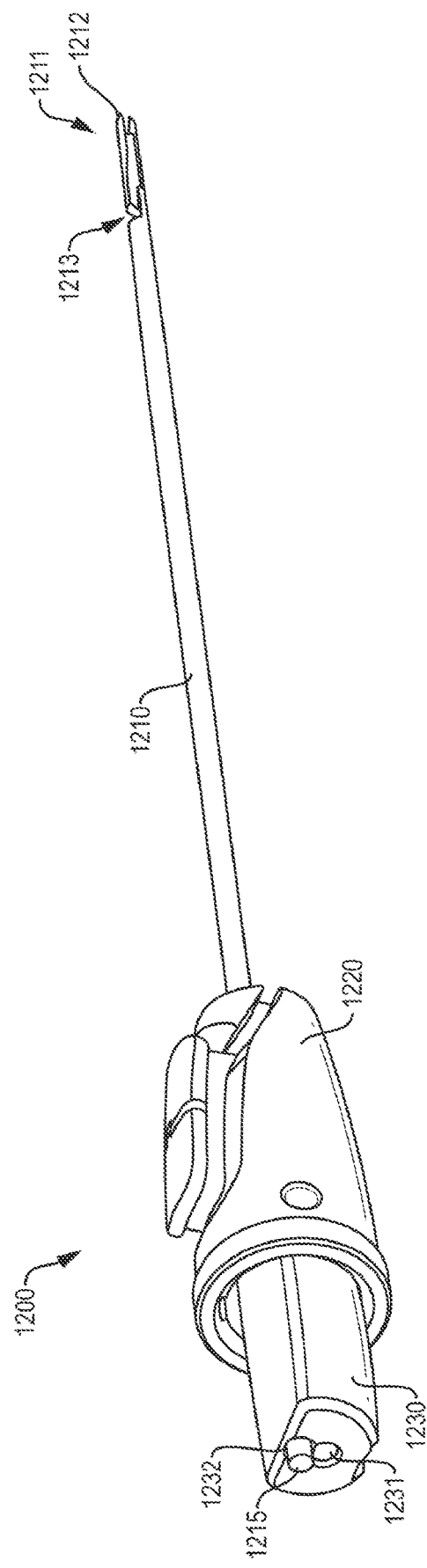
FIG. 12C is an isometric view of the second insertion tool of the dual insertion instrument assembly of FIG. 10A.

Depressing the flexible portion 1121 of the first handle 1120 can disconnect the tooth 1122 from a corresponding feature 1223 disposed in the recess 1222 of the second handle 1220, thereby allowing the first handle to be decoupled and separated from the second handle 1220, as shown in FIG. 11C, and, as discussed in more detail below with respect to FIGS. 12A and 12B. Continuing to refer to FIG. 11C, a flat portion 1235 of the proximal extension 1230 of the second handle is shown, which, when engaged with a corresponding flat section of the cavity 1126 of the first handle 1120, can provide rotational-locking of the first and second handles 1120, 1220 when coupled. In operation, with the first insertion shaft 1110 extending through the bore in the second proximal handle 1220, decoupling of the first handle 1120 can be effected by proximal translation of the first handle 1120 away from the second handle 1220 until the first insertion shaft 1110 is fully withdrawn from the second handle 1220. FIGS. 12A and 12B illustrate the removal (or insertion) of the first insertion device 1100 from the second insertion device 1200, with the first insertion shaft 1110 not fully withdrawn from the second handle 1220. A proximal terminal end 1215 of the second insertion shaft 1210 is visible extending proximally beyond the proximal end of the second handle 1220. This arrangement can allow for striking of the second insertion shaft 1210 with a hammer or other tool to facilitation insertion of the second distal tip 1211 into hard tissue, such as a bone. After the first insertion device 1100 is used to conduct a first insertion, the first insertion device can be fully removed from the second insertion device 1200 at the operative repair site before the use of the second insertion device to conduct a second insertion operation. FIG. 12C shows the second insertion device with the first insertion device decoupled and fully removed. In this configuration of FIG. 12C, the second insertion device 1200 can be used on its own to place and insert an anchor subsequent to the placement and insertion of a prior anchor.

Figure 13A:
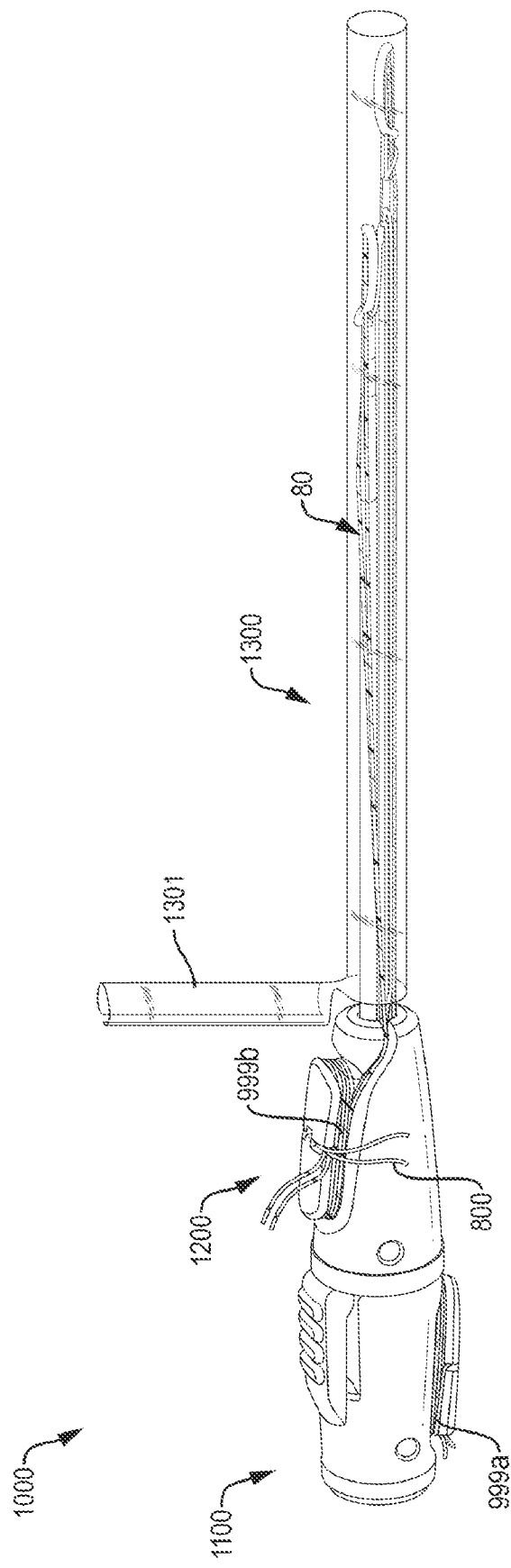
FIG. 13A is a photograph providing a side view of a dual insertion instrument assembly akin to the dual insertion instrument assembly of FIG. 10A, this dual insertion instrument assembly being in a ready-to-use configuration with the multi-loop tensionable suture construct and suture anchors of FIG. 8.

Examples of the present dual insertion instruments can also include the use of a breakaway sheath. The breakaway sheath can be, for example, a cannula with frangible and/or bendable sections and longitudinal perforations or other features to enable selective removal of portions radially from a shaft. The breakaway sheath can be configured to surround the two insertion shafts 1110, 1210 and a surgical implant (e.g., surgical implant 100 of FIG. 1, implant 80 of FIG. 8, as shown in FIG. 13A), or any other suture construct), and can be configured to protect the surgical implant carried by the insertion shafts 1110, 1210 by, for example, completely covering the insertion shafts 1110, 1210 and implant from the handles 1120, 1220 to the first distal tip 1111. In the illustrated embodiment, the breakaway sheath includes proximal segments 1301, 1302, 1303 (see FIGS. 13C and 14D) that can be frangible, bendable, and/or otherwise separable from a proximal portion of the insertion shafts 1110, 1210 without separating the remaining portion(s) of the breakaway sheath. In this manner, the removal or one or more proximal segments from the insertion shafts 1110, 1211 allows the remaining portion(s) of the breakaway sheath to be advanced proximally to, for example, expose the first distal tip 1111 for use. Subsequent removal of one or more further proximal segments can enable the second distal tip 1211 to be exposed for use. Accordingly, examples of the breakaway sheath disclosed herein provide protection that is modular and can be maintained, in part, over certain regions to protect those regions (e.g., a second anchor during insertion of a first anchor) before they are required to be uncovered for use.

Figure 13B:
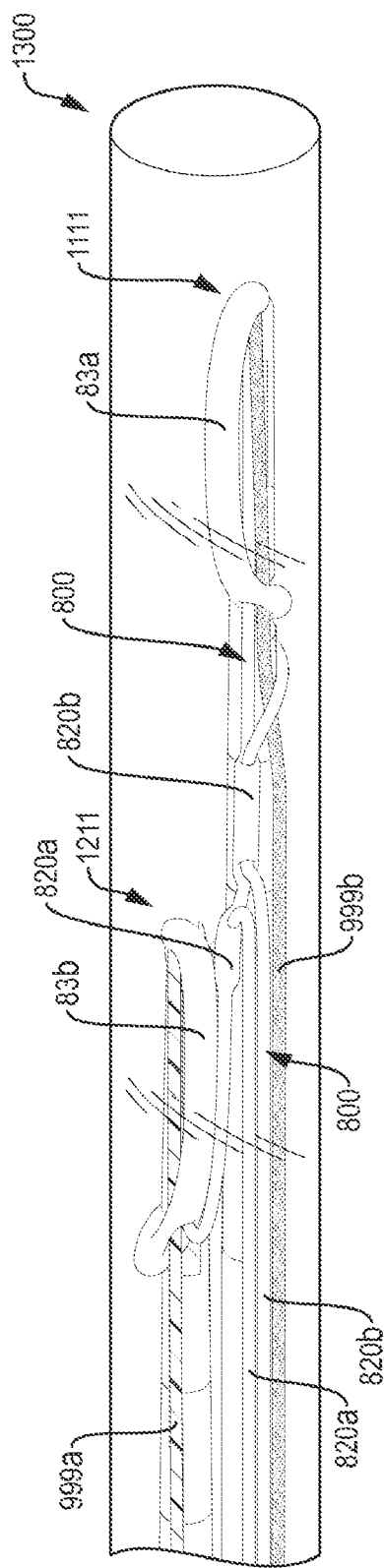
FIG. 13B is a close-up photograph providing a side view of a distal end of the dual insertion instrument assembly and suture construct of FIG. 13A.
Figure 13C:
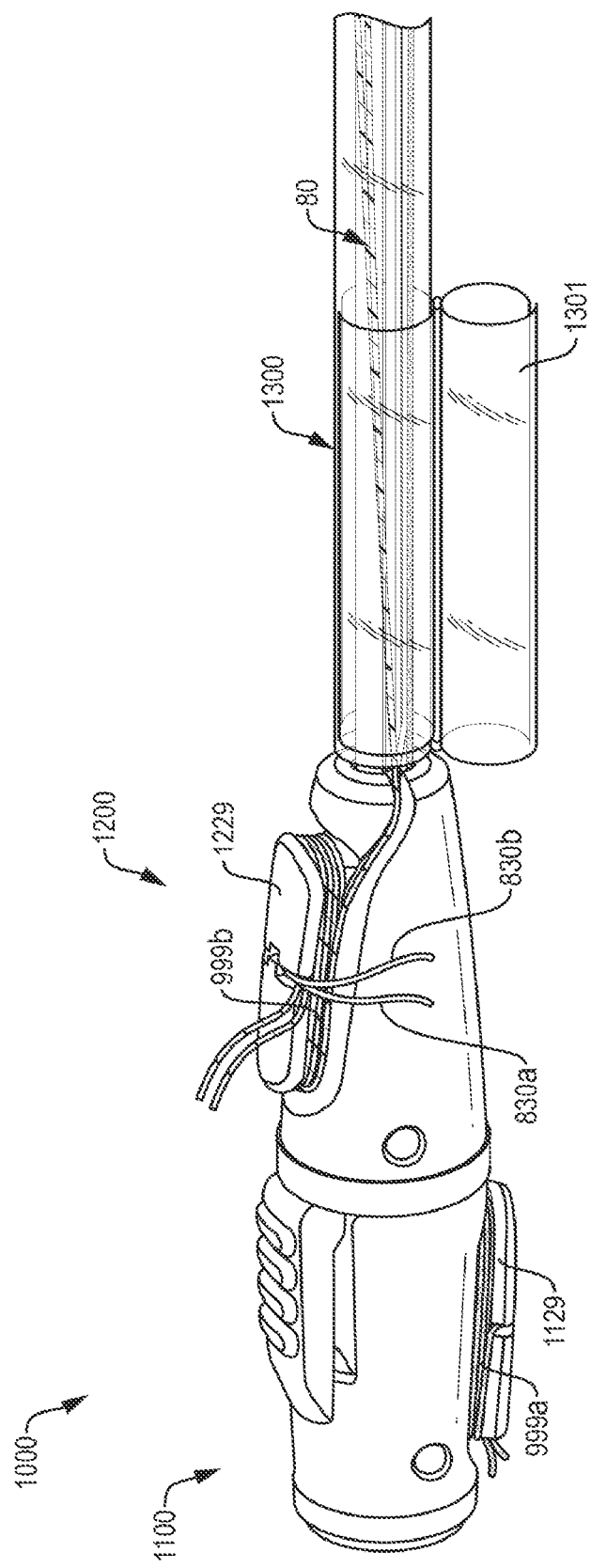
FIG. 13C is a close-up photograph providing a side view of a proximal end of the dual insertion instrument assembly and suture construct of FIG. 13A.

FIG. 13A is a photograph of the dual insertion instrument assembly 1000 of FIG. 10A in a ready-to-use configuration with the implant 80 of FIG. 8 and a breakaway sheath 1300 disposed around the implant 80 and insertion shafts 1110, 1210. The suture tails of the suture construct 800 are wrapped around the second spindle 1229 along with the additional suture 499b coupled with the second anchor, and the additional suture 499a coupled with the first anchor is wrapped around the first spindle 1129. FIG. 13B is a close-up photograph of the distal end of the dual insertion instrument assembly 1000. The first anchor 83a of the construct 800 is held in the distal tip 1111 of the first insertion shaft 1110 and the second anchor 83b is held in the distal tip 1211 of the second insertion shaft 1210, with the tails 820a, 820b and additional sutures 499a, 499b extending proximally along the shafts 1110, 1210 and inside the breakaway sheath 1300. In FIG. 13B, the breakaway sheath 1300 extends beyond the distal tip 1111 to completely cover the implant 80. FIG. 13C shows the proximal end of the breakaway sheath 1300 where it meets the handle of the dual insertion instrument 1000. A breakaway portion 1301 is shown after it has been removed from the shafts 1110, 1210 and the breakaway sheath 1300 translated proximally. FIG. 13C also shows the tails 830a, 830b wrapped around the second spindle 1229 with the second additional suture 999b, and the first additional suture 999a wrapped around the first spindle 1129. As explained below, the first breakaway portion 1301 can be used to assist a user in separating further breakaway portions and, with the first breakaway portion 1301 removed, the distal-most end of the instrument 1000 can still be covered.

Figure 14A:
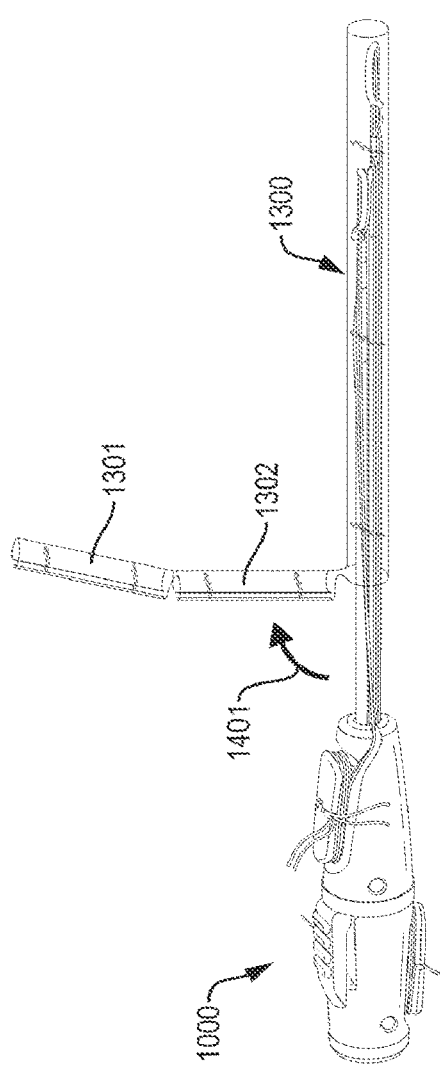
FIGS. 14A-14C are photographs providing perspective view of the dual insertion instrument assembly and suture construct of FIG. 13A showing operation of a breakaway sheath prior to insertion of the first anchor of the suture construct.
Figure 14B:
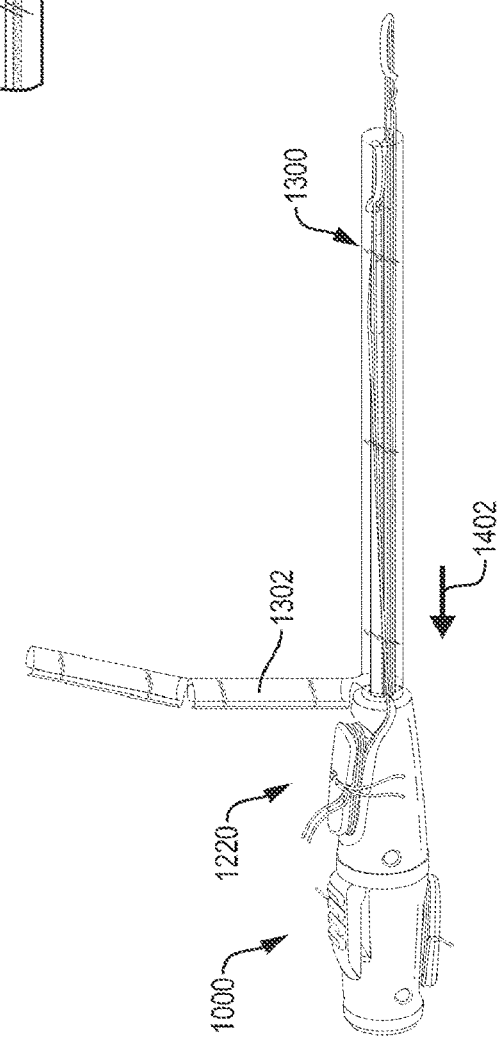
Figure 14C:
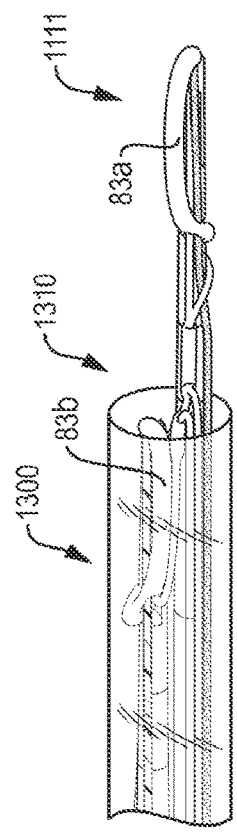

FIGS. 14A-14C are photographs of the dual insertion instrument assembly 1000 and suture construct 80 showing the operation of the breakaway sheath 1300 prior to insertion of the first anchor 83a of the suture construct 80. Note that the first and second anchors (and associated additional sutures) of the implant 80 can be reversible, and, as shown in FIGS. 14A-14F, the first anchor can be reversed from the indication of FIG. 8. The designation of the first anchor being installed first is maintained, even if the color of the additional sutures 999a, 999b indicate that the anchors are installed in the reverse order as indicated by the naming convention used above. From the initial configuration of FIGS. 13A-13C, the first step of removing a second breakaway portion 1302 of the sheath 1300 is shown in FIG. 14A, with arrow 1401 indicating the movement of the second breakaway portion 1302 from the shafts 11100, 1210. With the second portion 1302 removed, the breakaway sheath 1300 can be moved proximally, as indicated by arrow 1402 in FIG. 14B, to retreat a distal end 1310 of the breakaway sheath 1300 to expose the first distal tip 1111 and the first anchor 83b. In this position of FIG. 14C, a first insertion operation can be conducted with the instrument 1000 to install the first anchor 83*a* in tissue.

Figure 14D:
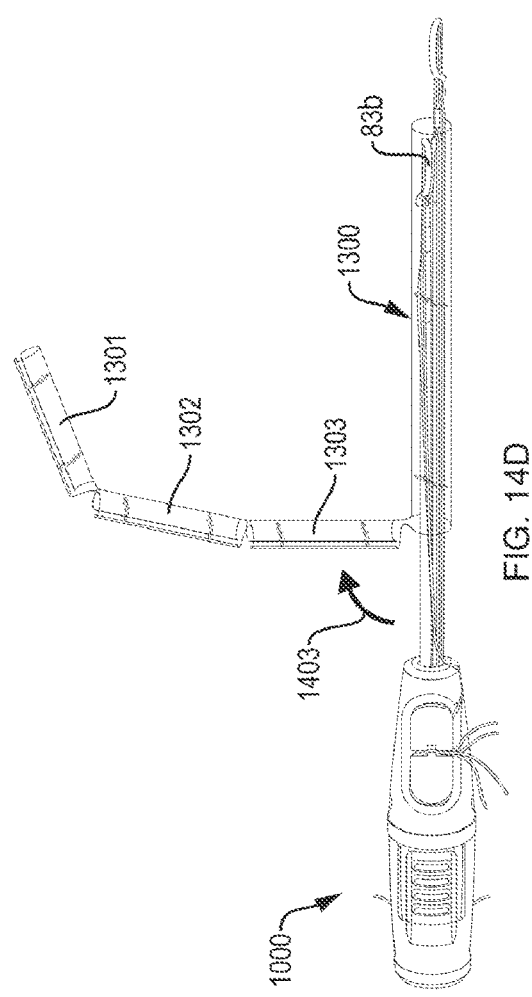
FIGS. 14D-14F are photographs providing top, perspective, and perspective views, respectively, of the dual insertion instrument assembly and suture construct of FIG. 13A showing the operation of the breakaway sheath prior to insertion of the second anchor of the suture construct.
Figure 14F:
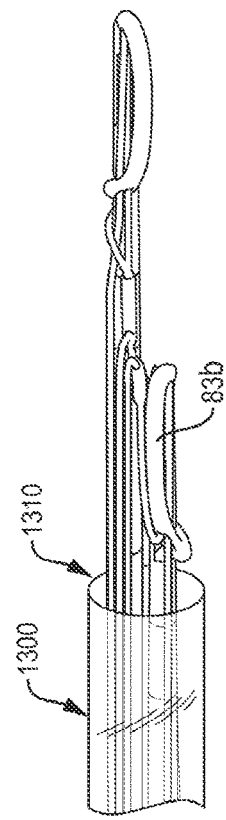
Figure 14E:
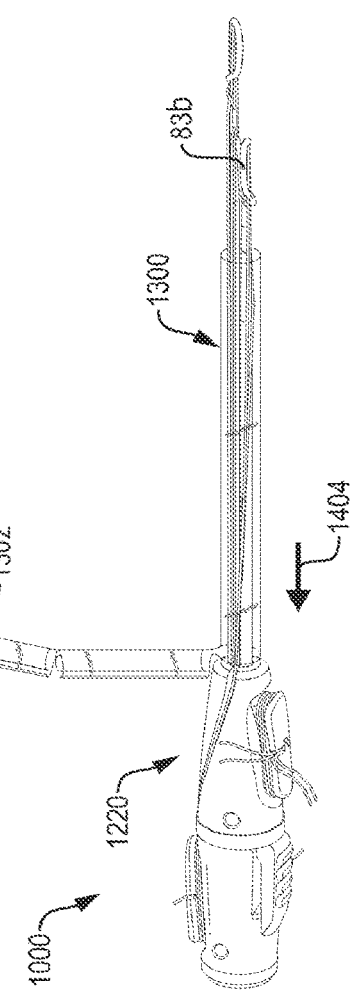

FIGS. 14D-14F are photographs of the dual insertion instrument assembly 1000 and suture construct 80 showing the operation of the breakaway sheath 1300 prior to insertion of the second anchor 83*b* of the suture construct 80. From the configuration of FIG. 14C, with the first insertion operation complete, the first additional suture can be unwound from the first spindle 1129 and the first insertion device 1100 can be removed from the second insertion device 1200. This operation, however, is not illustrated as having been done in FIGS. 14D-14F, and so it can be assumed, though not shown, that the first shaft and first handle are no longer present in the following steps. In FIG. 14D, a third breakaway portion 1303 of the breakaway sheath 1300 can be removed from the second insertion shaft, as indicated by arrow 1403. Afterwards, and as shown in FIG. 14E, the breakaway sheath 1300 can be translated (as indicated by arrow 1404) proximally to expose the second distal tip 1211 and the second anchor 83*b*, which is also shown in FIG. 14F. From this configuration of FIGS. 14E and 14F, the second insertion device 1200 can be used to conduct a second insertion operation to install the second anchor 83*b*. An example installation operation showing the separation of the dual insertion instrument 1000 is provided in FIGS. 15A-15G.

Figure 15B:
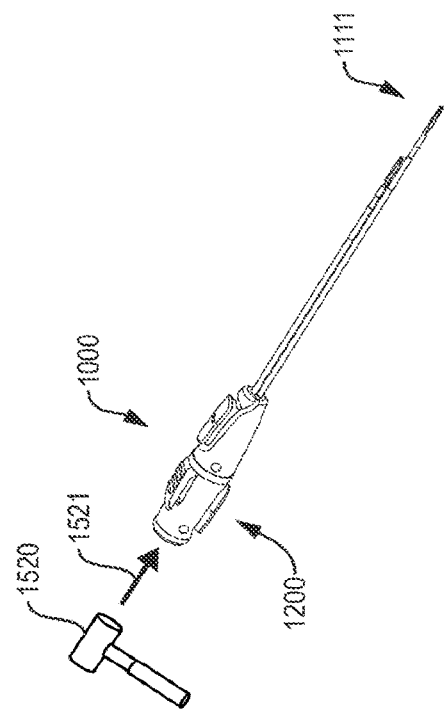
FIGS. 15A-15C are perspective views illustrating a use of the dual insertion instrument assembly and suture construct of FIG. 13A to insert a first anchor of the suture construct.
Figure 15D:
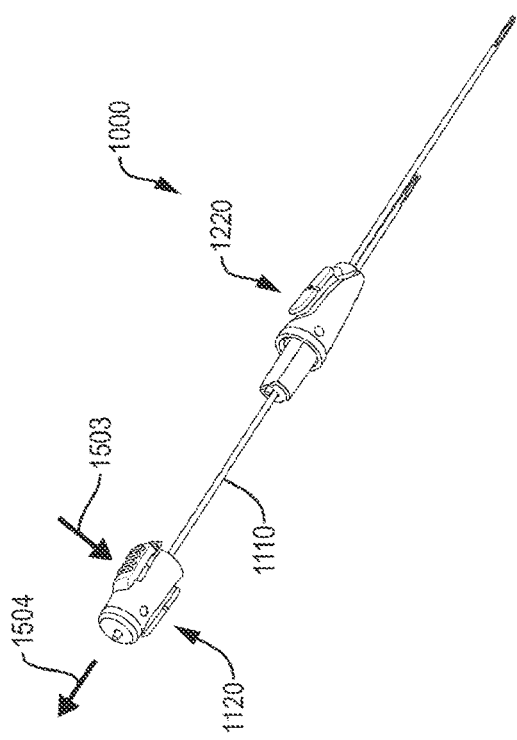
FIG. 15D is a perspective view illustrating a separation of the first insertion instrument from the second insertion instrument of the dual insertion instrument assembly of FIG. 15A.
Figure 15A:
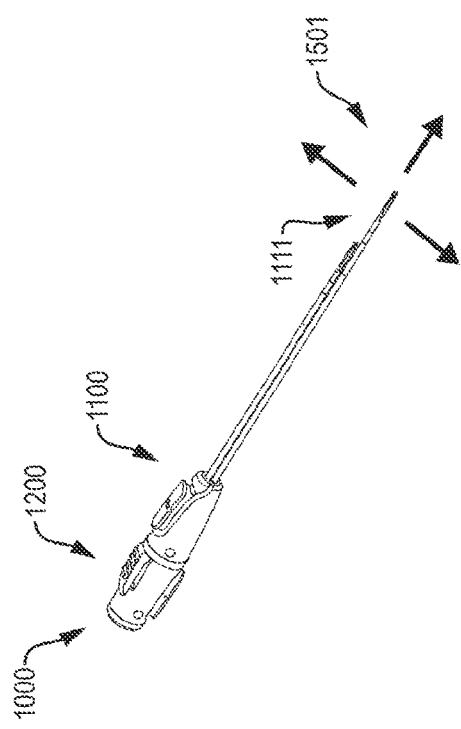
Figure 15C:
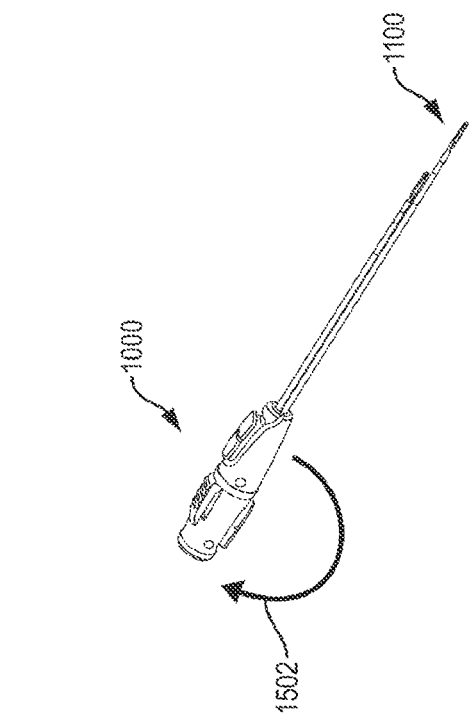
Figure 15F:
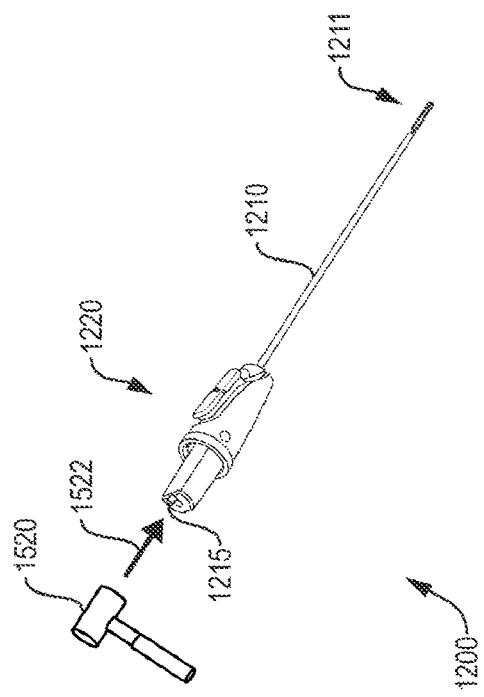
FIGS. 15E-15G are perspective views illustrating a use of the second insertion instrument of the dual insertion instrument assembly to insert a second anchor of the suture construct of FIG. 15A.
Figure 15E:
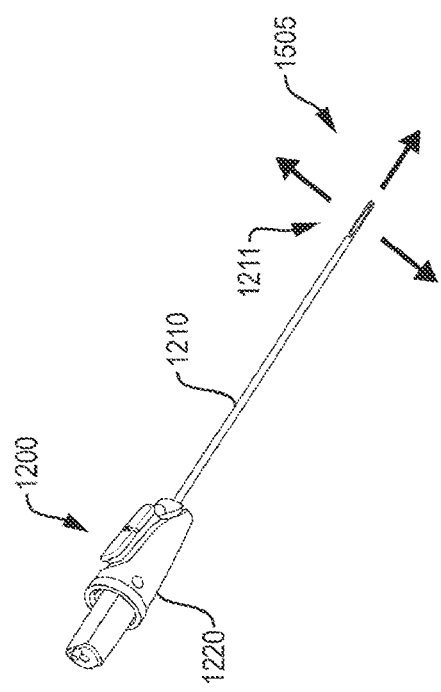
Figure 15G:
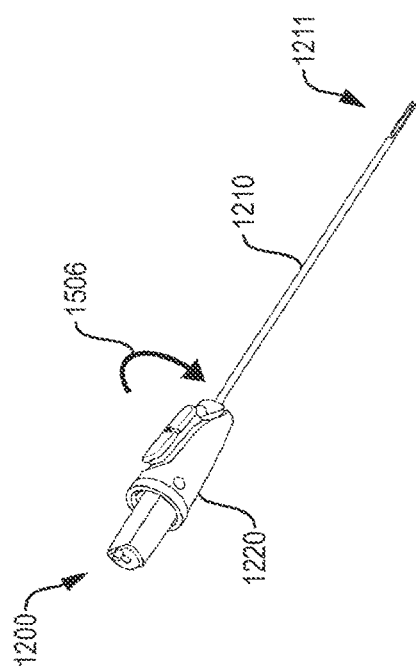

In FIG. 15A, a dual insertion instrument 1000 assembly is shown in an initial condition with the first and second handles coupled together. A surgical implant 80, 100 is not shown, but is assumed to be present in, for example, the configuration of FIGS. 13A-13C, with, on each of the two shafts, a soft anchor (e.g., anchor 83*a*, 83*b*) is pre-loaded for implantation, and the associated sutures are held on the handles 1120, 1220. As discussed above, in the assembled configuration of FIGS. 13A-13C and 15A, a longer first insertion shaft 1110, attached to the more proximal of the handles, presents the first of the anchors for implantation through soft tissue and into bone, such as by striking the proximal end of the assembly with a mallet 1520 or other impacting tool after positioning the tip of the first shaft on the tissue. Accordingly, in a first step, as shown in FIG. 15A, the instrument 1000 can be brought to a surgical repair site and the first distal tip 1111 can be navigated (as indicated by arrows 1501) to a desired first position of soft tissue. In the next step, as shown in FIG. 15B, the first anchor can be implanted into a second tissue at a second location by impacting the proximal end of the first shaft with the mallet 1520 (as indicated by arrow 1521) to drive the first distal tip 1111 into the second tissue at the second location. With the first anchor installed, the first additional suture (e.g., 999*a* of FIG. 8) can be unwound (as indicated by arrow 1502) from the first proximal handle. With the suture off of the first proximal handle, the flexible portion (e.g., 1121 of FIG. 10C) can be depressed (as indicated by arrow 1503) to release the first proximal handle 1120 from the second proximal handle 1220, after which the first proximal handle can be withdrawn proximally (as indicated by arrow 1504) until the first shaft 1110 is free of the second proximal handle 1220, as shown in FIG. 15E, leaving the second anchor on the second shaft attached to the second handle. The second distal tip 1211 can then be navigated (as indicated by arrow 1505) to a third location (e.g., a different location on the soft tissue from the first location). As shown in FIG. 15F, implantation of the second anchor can be done by striking the proximal end of the second handle with the mallet 1520 or other impacting tool to place the second anchor into or through the soft tissue and into or through the second tissue at a fourth location (e.g., a different location in the second tissue from the second implanted location of the first anchor). With the second anchor installed, the tails of the suture construct and the second additional suture can be unwound from the second spindle (as indicated by arrow 1506), at which point the second insertion device 1200 can be removed. The spanning portion of the construct between the two anchors can subsequently be tensioned via the tails to complete the repair, resulting in, for example, the installed arrangement of FIGS. 5A and 5B.

One skilled in the art will appreciate further features and advantages of the disclosures based on the provided for descriptions and embodiments. Accordingly, the inventions are not to be limited by what has been particularly shown and described. All publications and references cited herein are expressly incorporated herein by reference in their entirety.

Examples of the above-described embodiments can include the following:

1. A suture construct formed from a first flexible member, comprising:
    a first adjustment mechanism formed in the first flexible member to create a first loop extending from the first adjustment mechanism, the first loop defining a first loop opening;
    a first tail of the first flexible member extending from the first adjustment mechanism;
    a spanning portion of the first flexible member extending from the first adjustment mechanism;
    a second adjustment mechanism formed in the first flexible member to create a second loop extending from the second adjustment mechanism, the second loop defining a second loop opening;
    a second tail of the first flexible member extending from the second adjustment mechanism;
    a first anchor slidably coupled to a first portion of the suture of the first loop; and
    a second anchor slidably coupled to a second portion of the suture of the second loop,
    wherein the first tail is configured to slide with respect to the first adjustment mechanism to reduce a size of the first loop opening, and thus reduce a first distance between the first anchor and the first adjustment mechanism,
    wherein the second tail is configured to slide with respect to the second adjustment mechanism to reduce a size of the second loop opening, and thus reduce a second distance between the first anchor and the second adjustment mechanism, and
    wherein the spanning portion of the first flexible member defines a fixed a distance along the suture between the first adjustment mechanism and the second adjustment mechanism.
2. The suture construct of example 1, wherein at least one of the first adjustment mechanism or the second adjustment mechanism comprises a self-locking knot.
3. The suture construct of example 1 or 2, wherein at least one of the first adjustment mechanism or the second adjustment mechanism comprises a finger trap arrangement.
4. The suture construct of any of examples 1 to 3,
    wherein the first adjustment mechanism comprises a first finger trap with the first tail passing through the first finger trap,
    wherein the second adjustment mechanism comprises a second finger trap with the second tail passing through the second finger trap, and wherein the spanning portion is defined by a fixed length of suture between the first finger trap and the second finger trap.
5. The suture construct of example 4, wherein the first and second finger traps each define a length along the first flexible member approximately in the range of about 2 mm to about 10 mm.
6. The suture construct of any of examples 1 to 5, wherein the fixed length of the spanning portion is approximately in the range of about 2 mm to about 10 mm.
7. The suture construct of any of examples 1 to 6, wherein at least one of the first anchor or the second anchor is a soft anchor constructed from a woven material.
8. The suture construct of any of examples 1 to 7, where the first flexible member is a single continuous flexible member.
9. The suture construct of any of examples 1 to 8, further comprising a second flexible member extending through the first anchor such that the first anchor is also slidably disposed on the second flexible member.
10. The suture construct of example 9, wherein the first flexible member and the second flexible member extend through a same path through the first anchor.
11. The suture construct of example 9 or 10, further comprising a third flexible member extending through the second anchor such that the second anchor is also slidably disposed on the third flexible member.
12. The suture construct of any of examples 9 to 11, wherein the second flexible member is a flexible member of a loop of another suture construct according to claim 1.
13. A method for preparing a surgical implant, comprising:
    passing a first tail of a first flexible member through a first anchor;
    after passing the first tail through the first anchor, creating a first loop in the first flexible member by forming a first adjustment mechanism, the first flexible member with the first tail and a first portion of the first flexible member extending from one side of the first adjustment mechanism and the first loop extending from an opposite side of the first adjustment mechanism such that the first anchor is slidably disposed on the first flexible member of the first loop;
    passing a second tail of the first flexible member through a second anchor; and
    after passing the second tail through the second anchor, creating a second loop in the first flexible member by forming a second adjustment mechanism, the first flexible member with the second tail and a second portion of the first flexible member extending from one side of the second adjustment mechanism and the second loop extending from an opposite side of the second adjustment mechanism such that the second anchor is slidably disposed on the first flexible member of the second loop,
    wherein the first portion of the first flexible member and the second portion of the first flexible member together define a spanning portion of the first flexible member that defines a fixed length of the first flexible member between the first adjustment mechanism and the second adjustment mechanism,
    wherein tension on the first tail cinches the first loop and reduces a maximum distance between the first anchor and the spanning portion, and
    wherein tension on the second tail cinches the first loop and reduces a maximum distance between the second anchor and the spanning portion.
14. The method of example 13, wherein at least one of the first adjustment mechanism or the second adjustment mechanism comprises a self-locking knot.
15. The method of example 13 or 14, wherein at least one of the first adjustment mechanism or the second adjustment mechanism comprises a finger trap arrangement.
16. The method of any of examples 13 to 15,
    wherein the first adjustment mechanism comprises a first finger trap with the first tail passing through the first finger trap,
    wherein the second adjustment mechanism comprises a second finger trap with the second tail passing through the second finger trap, and
    wherein the spanning portion is defined by a fixed length of suture between the first finger trap and the second finger trap.
17. The method of any of examples 13 to 16, where the first flexible member is a single continuous flexible member.
18. The method of any of examples 13 to 17, further comprising passing a tail of a second flexible member through the first anchor such that the first anchor is also slidably disposed on the second flexible member.
19. The method of example 18, wherein the first flexible member and the second flexible member extend through a same path through the first anchor.
20. The method of example 18 or 19, further comprising passing a tail of a third suture filament through the second anchor such that the second anchor is also slidably disposed on the third suture filament.
21. The method of any of examples 18 to 20, wherein the second suture filament is a suture filament of a loop of another suture construct according to claim 1.
22. A surgical instrument, comprising:
    a first insertion device, comprising:
        a first inserter shaft having a first distal tip configured to hold and implant an anchor into tissue; and
        a first handle disposed about a proximal end of the first inserter shaft; and
    a second insertion device configured to couple with the first insertion device, the second insertion device comprising:
        a second inserter shaft having a second distal tip configured to hold and implant an anchor into tissue; and
        a second handle disposed about a proximal end of the second inserter shaft, the second handle having a bore therethrough and configured to have the first inserter shaft disposed therein when the second insertion device is coupled with the first insertion device,
    wherein the first handle is configured to removably couple to a distal end of the second handle such that the first insertion device can be decoupled from the second insertion device by proximally withdrawing the first handle from the second handle and thereby proximally withdrawing the first inserter shaft from the bore of the second handle, and
    wherein the first distal tip of the first inserter shaft extends distally beyond the second distal tip of the second inserter shaft when the first and second insertion devices are coupled.

23. The surgical instrument of example 22, wherein a proximal tip of the first insertion shaft extends proximally beyond the first handle.

24. The surgical instrument of example 22 or 23, wherein a proximal tip of the second insertion shaft extends proximally beyond the second handle.

25. The surgical instrument of any of examples 22 to 24, wherein the first and second insertion shafts are adjacent and substantially parallel along their respective lengths when the first instrument is coupled with the second instrument.

26. The surgical instrument of any of examples 22 to 25, wherein the first handle comprises a latch configured to removably secure the coupling of the first handle to the second handle, and
wherein the first handle comprises a flexible portion for controlling engagement of the latch with the second handle and enabling force applied to the flexible portion by a user to release the engagement of the latch with the second handle.

27. The surgical instrument of any of examples 22 to 26, wherein the first handle has a first spindle configured to hold a length of suture extending from the first distal tip.

28. The surgical instrument of example 27, wherein the second handle has a second spindle configured to hold a length of suture extending from the second distal tip.

29. The surgical instrument of example 28, wherein the second handle comprises a recess configured to receive a length of suture extending from the first distal tip to the first spindle.

30. The surgical instrument of any of examples 22 to 29, further comprising:
a breakaway sheath configured to be disposed around the first and second instrument shafts and extend from the second handle to the first distal tip, the proximal end of the breakaway sheath defining a first section configured to be removed from being disposed around the first and second instrument shafts and, after being removed, allow proximal translation of the breakaway sheath to expose the first distal tip while still covering the second distal tip.

31. The surgical instrument of example 30, wherein the breakaway sheath further comprises:
a second section, arranged distal to the first section, and configured to be removed from being disposed around the first and second instrument shafts and, after being removed, allow proximal translation of the breakaway sheath to expose the second distal tip.

32. The surgical instrument of any of examples 22 to 31, further comprising:
the suture construct of claim 1 coupled to the surgical instrument with the first anchor held by the first distal tip, the second anchor held by the second distal tip, and the first and second tails of the first flexible member secured to the second handle.

33. The surgical instrument of any of examples 22 to 32, wherein the first and second handles, when coupled, define a continuous single handle of the surgical instrument.

34. A method of securing soft tissue to bone, the method comprising:
navigating a first distal tip of a first insertion shaft of a first instrument carrying a first anchor through a soft tissue at a first location and inserting the first anchor into bone at a second location, the anchor having a first cinchable loop of a suture construct coupled thereto;
disposing the first anchor in the second location by withdrawing the first distal tip from the first and second locations, the withdrawing comprising proximally withdrawing the first insertion shaft from a second handle of a second instrument, the second instrument having a second insertion shaft with a second distal tip carrying a second anchor, the second anchor having a second cinchable loop of the suture construct coupled thereto;
navigating the second distal tip of the second first insertion shaft through the soft tissue at a third location and inserting the anchor into bone at a fourth location;
disposing the second anchor in the fourth location by withdrawing the second distal tip from the third and fourth locations, the withdrawing comprising disposing a spanning portion of the suture construct across the soft tissue, the spanning portion fixedly coupling a first adjustment mechanism of the first cinchable loop to a second adjustment mechanism of the second cinchable loop; and
tensioning the spanning portion against the soft tissue by at least one of:
tensioning a first tail of the suture construct extending from the first adjustment mechanism, the tensioning cinching the first loop and drawing the first adjustment mechanism towards the first anchor; and
tensioning a second tail of the suture construct extending from the second adjustment mechanism, the tensioning cinching the second loop and drawing the second adjustment mechanism towards the second anchor.

35. The method of example 34, wherein the second anchor includes a third cinchable loop of a second suture construct coupled thereto, the method further comprising:
after disposing the second anchor in the fourth location, navigating a distal tip of an insertion shaft carrying a third anchor through the soft tissue at a fifth location and inserting the third anchor into bone at a sixth location, the third anchor having a fourth cinchable loop of the second suture construct coupled thereto,
disposing the third anchor in the sixth location by withdrawing the distal tip from the fifth and sixth locations, the withdrawing comprising disposing a second spanning portion of the second suture construct across the soft tissue, the second spanning portion fixedly coupling a third adjustment mechanism of the third cinchable loop to a fourth adjustment mechanism of the fourth cinchable loop; and
tensioning the spanning portion against the soft tissue by at least one of:
tensioning a third tail of the second suture construct extending from the third adjustment mechanism, the tensioning cinching the third loop and drawing the third adjustment mechanism towards the second anchor; and
tensioning a fourth tail of the second suture construct extending from the fourth adjustment mechanism, the tensioning cinching the fourth loop and drawing the fourth adjustment mechanism towards the third anchor.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A suture construct formed from a first flexible member, comprising:
   a first knot, splice, or finger trap formed in the first flexible member to create a first loop extending from the knot, splice, or finger trap, the first loop defining a first loop opening;
   a first tail of the first flexible member extending from the first knot, splice, or finger trap;
   a spanning portion of the first flexible member extending from the first knot, splice, or finger trap;
   a second knot, splice, or finger trap formed in the first flexible member to create a second loop extending from the second knot, splice, or finger trap, the second loop defining a second loop opening;
   a second tail of the first flexible member extending from the second knot, splice, or finger trap;
   a first anchor slidably coupled to a first portion of the suture of the first loop; and
   a second anchor slidably coupled to a second portion of the suture of the second loop,
   wherein the first tail is configured to slide with respect to the first knot, splice, or finger trap to reduce a size of the first loop opening, and thus reduce a first distance between the first anchor and the first knot, splice, or finger trap,
   wherein the second tail is configured to slide with respect to the second knot, splice, or finger trap to reduce a size of the second loop opening, and thus reduce a second distance between the first anchor and the second knot, splice, or finger trap,
   wherein the spanning portion of the first flexible member defines a fixed distance along the suture between the first knot, splice, or finger trap and the second knot, splice, or finger trap, and
   wherein the first loop terminates within the first anchor when the first anchor is slidably coupled to the first portion of the suture of the first loop, or the second loop terminates within the second anchor when the second anchor is slidably coupled to the second portion of the suture of the second loop.

2. The suture construct of claim 1, wherein at least one of the first knot, splice, or finger trap or the second knot, splice, or finger trap comprises a self-locking knot.

3. The suture construct of claim 1, wherein at least one of the first knot, splice, or finger trap or the second knot, splice, or finger trap is a finger trap.

4. The suture construct of claim 1,
   wherein the first finger trap includes the first tail passing through the first finger trap,
   wherein the second finger trap includes the second tail passing through the second finger trap, and
   wherein the spanning portion is defined by a fixed length of suture between the first finger trap and the second finger trap.

5. The suture construct of claim 4, wherein the first and second finger traps each define a length along the first flexible member in the range of about 2 mm to about 10 mm.

6. The suture construct of claim 1, wherein the fixed length of the spanning portion is in the range of about 2 mm to about 10 mm.

7. The suture construct of claim 1, where the first flexible member is a single continuous flexible member.

8. The suture construct of claim 1, further comprising a second flexible member extending through the first anchor such that the first anchor is also slidably disposed on the second flexible member.

9. The suture construct of claim 8, wherein the second flexible member is a flexible member of a loop of another suture construct having a third knot, splice, or finger trap formed in the second flexible member to create a third loop extending from the knot, splice, or finger trap, the third loop defining a third loop opening;
   a third tail of the second flexible member extending from the third knot, splice, or finger trap;
   a spanning portion of the second flexible member extending from the third knot, splice, or finger trap;
   a fourth knot, splice, or finger trap formed in the second flexible member to create a fourth loop extending from the fourth knot, splice, or finger trap, the fourth loop defining a fourth loop opening;
   a fourth tail of the second flexible member extending from the fourth knot, splice, or finger trap;
   the first anchor slidably coupled to the third portion of the suture of the third loop; and
   a third anchor slidably coupled to a fourth portion of the suture of the fourth loop,
   wherein the third tail is configured to slide with respect to the third knot, splice, or finger trap to reduce a size of the third loop opening, and thus reduce a third distance between the first anchor and the third knot, splice, or finger trap,
   wherein the fourth tail is configured to slide with respect to the fourth knot, splice, or finger trap to reduce a size of the fourth loop opening, and thus reduce a fourth distance between the third anchor and the fourth knot, splice, or finger trap, and
   wherein the spanning portion of the second flexible member defines a fixed distance along the suture between the third knot, splice, or finger trap and the fourth knot, splice, or finger trap.

10. A surgical construct, comprising:
    a first anchor;
    a second anchor;
    a first portion of a flexible member coupled to the first anchor;
    a second portion of a flexible member coupled to the second anchor;
    a first knot, splice, or finger trap that includes at least a portion thereof formed from the flexible member that includes the first portion;
    a second knot, splice, or finger trap that includes at least a portion thereof formed from the flexible member that includes the second portion;
    a first tail extending from the first knot, splice, or finger trap, the first tail being configured to slide with respect to the first knot, splice, or finger trap to reduce a distance between the first knot, splice, or finger trap and the first anchor;
    a second tail extending from the second knot, splice, or finger trap, the second tail being configured to slide with respect to the second knot, splice, or finger trap to reduce a distance between the second knot, splice, or finger trap and the second anchor;

a flexible spanning portion extending between the first knot, splice, or finger trap and the second knot, splice, or finger trap, the spanning portion defining a fixed a distance between the first knot, splice, or finger trap and the second knot, splice, or finger trap, wherein at least one of the first anchor or the second anchor comprises a tunnel through which the flexible member passes, the tunnel extending from an inner surface location of the at least one of the first anchor or the second anchor and terminating prior to an outer surface location of the at least one of the first anchor or the second anchor.

11. The surgical construct of claim 10,
wherein a first loop extends between the first anchor and the first knot, splice, or finger trap in an installed configuration of the surgical construct, and
wherein a second loop extends between the second anchor and the second knot, splice, or finger trap in the installed configuration of the surgical construct.

12. The surgical construct of claim 10, wherein at least one of the first knot, splice, or finger trap or the second knot, splice, or finger trap comprises a self-locking knot.

13. The surgical construct of claim 10, wherein at least one of the first knot, splice, or finger trap or the second knot, splice, or finger trap comprises a finger trap arrangement.

14. The surgical construct of claim 10,
wherein the first finger trap includes the first tail passing through the first finger trap,
wherein the second finger trap includes the second tail passing through the second finger trap, and
wherein the spanning portion is defined by a fixed length of suture between the first finger trap and the second finger trap.

15. The surgical construct of claim 10, wherein the fixed distance of the spanning portion is in the range of about 2 mm to about 10 mm.

16. The surgical construct of claim 10, wherein the flexible member coupled to the first anchor and includes the first portion of a flexible member, and the flexible member coupled to the second anchor and includes the second portion of a flexible member are the same flexible member.

17. The surgical construct of claim 10, wherein the flexible member coupled to the first anchor and includes the first portion of a flexible member is a first flexible member and the flexible member coupled to the second anchor and includes the second portion of a flexible member is a second flexible member, the first and second flexible members being separate flexible members.

18. The surgical construct of claim 10, further comprising:
another flexible member coupled to the first anchor, the another flexible member being a separate flexible member than the flexible member that includes the first portion of a flexible member; and
still another flexible member coupled to the second anchor, the still another flexible member being a separate flexible member than the flexible member that includes the second portion of a flexible member.

19. The surgical construct of claim 18,
wherein the another flexible member is a flexible member of a loop of another surgical construct having the first anchor;
a third anchor;
a third portion of the another flexible member coupled to the first anchor;
a fourth portion of the another flexible member coupled to the third anchor;

a third knot, splice, or finger trap that includes at least a portion thereof formed from the another flexible member that includes the third portion;
a fourth knot, splice, or finger trap that includes at least a portion thereof formed from the another flexible member that includes the fourth portion;
a third tail extending from the third knot, splice, or finger trap, the third tail being configured to slide with respect to the third knot, splice, or finger trap to reduce a distance between the third knot, splice, or finger trap and the first anchor;
a fourth tail extending from the fourth knot, splice, or finger trap, the fourth tail being configured to slide with respect to the fourth knot, splice, or finger trap to reduce a distance between the fourth knot, splice, or finger trap and the third anchor; and
a flexible spanning portion extending between the third knot, splice, or finger trap and the fourth knot, splice, or finger trap, the spanning portion defining a fixed a distance between the third knot, splice, or finger trap and the fourth knot, splice, or finger trap, and
wherein the still another flexible member is a flexible member of a loop of still another surgical construct having the second anchor;
a fourth anchor;
a fifth portion of the still another flexible member coupled to the second anchor;
a sixth portion of the still another flexible member coupled to the fourth anchor;
a fifth knot, splice, or finger trap that includes at least a portion thereof formed from the still another flexible member that includes the fifth portion;
a sixth knot, splice, or finger trap that includes at least a portion thereof formed from the still another flexible member that includes the sixth portion;
a fifth tail extending from the fifth knot, splice, or finger trap, the fifth tail being configured to slide with respect to the fifth knot, splice, or finger trap to reduce a distance between the fifth knot, splice, or finger trap and the second anchor;
a sixth tail extending from the sixth knot, splice, or finger trap, the sixth tail being configured to slide with respect to the sixth knot, splice, or finger trap to reduce a distance between the sixth knot, splice, or finger trap and the fourth anchor; and
a flexible spanning portion extending between the fifth knot, splice, or finger trap and the sixth knot, splice, or finger trap, the spanning portion defining a fixed a distance between the fifth knot, splice, or finger trap and the sixth knot, splice, or finger trap.

20. A surgical construct, comprising:
a first anchor;
a second anchor;
a first portion of a flexible member coupled to the first anchor;
a second portion of a flexible member coupled to the second anchor;
a first knot, splice, or finger trap that includes at least a portion thereof formed from the flexible member that includes the first portion;
a second knot, splice, or finger trap that includes at least a portion thereof formed from the flexible member that includes the second portion;
a first tail extending from the first knot, splice, or finger trap, the first tail being configured to slide with respect to the first knot, splice, or finger trap to reduce a distance between the first knot, splice, or finger trap and the first anchor;

a second tail extending from the second knot, splice, or finger trap, the second tail being configured to slide with respect to the second knot, splice, or finger trap to reduce a distance between the second knot, splice, or finger trap and the second anchor;

a flexible spanning portion extending between the first knot, splice, or finger trap and the second knot, splice, or finger trap, the spanning portion defining a fixed a distance between the first knot, splice, or finger trap and the second knot, splice, or finger trap, wherein at least one of:

the first portion of the flexible member that passes through a tunnel in the first anchor defines a first loop that extends from one inner surface location of the first anchor to another inner surface location of the first anchor, with the first loop being disposed between the first knot, splice, or finger trap and the first anchor throughout its length; or the second portion of the flexible member that passes through a tunnel in the second anchor defines a second loop that extends from one inner surface location of the second anchor to another inner surface location of the second anchor, with the second loop being disposed between the second knot, splice, or finger trap and the second anchor throughout its length.

* * * * *